US011962796B2

United States Patent
Huang et al.

(10) Patent No.: US 11,962,796 B2
(45) Date of Patent: *Apr. 16, 2024

(54) GRADIENT-BASED PREDICTION REFINEMENT FOR VIDEO CODING

(71) Applicant: QUALCOMM Incorporated, San Diego, CA (US)

(72) Inventors: Han Huang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/836,013

(22) Filed: Mar. 31, 2020

(65) Prior Publication Data

US 2020/0314443 A1    Oct. 1, 2020

Related U.S. Application Data

(60) Provisional application No. 62/837,405, filed on Apr. 23, 2019, provisional application No. 62/827,677, filed on Apr. 1, 2019.

(51) Int. Cl.
*H04N 11/02* (2006.01)
*H04N 19/513* (2014.01)

(52) U.S. Cl.
CPC ................... *H04N 19/513* (2014.11)

(58) Field of Classification Search
CPC .................................................. H04N 19/109

(Continued)

(56) References Cited

U.S. PATENT DOCUMENTS 10,694,204 B2 * 6/2020 Chen .................... H04N 19/503
2018/0184083 A1 * 6/2018 Panusopone ........... H04N 19/11
(Continued)

FOREIGN PATENT DOCUMENTS

WO    2017036399 A1    3/2017
WO    2019195643 A1    10/2019

OTHER PUBLICATIONS

Jiancong (Daniel) Luo et al.(Hereinafter referred to as "Jia"), CE2-related: Prediction refinement with optical flow for affine mode, Document: JVET-N0236-r5, AA Mar. 19-27, 2019, 8 pages. (Year: 2019).*

(Continued)

*Primary Examiner* — Leron Beck
(74) *Attorney, Agent, or Firm* — Shumaker & Sieffert, PA

(57) ABSTRACT

This disclosure describes gradient-based prediction refinement. A video coder (e.g., video encoder or video decoder) determines one or more prediction blocks for inter-predicting a current block (e.g., based on one or more motion vectors for the current block). In gradient-based prediction refinement, the video coder modifies one or more samples of the prediction block based on various factors such as displacement in a horizontal direction, the horizontal gradient, a displacement in the vertical direction, and a vertical gradient. This disclosure provides for gradient-based prediction refinement where a precision level of the displacement (e.g., at least one of the horizontal or vertical displacement) is unified (e.g., the same) for different prediction modes.

25 Claims, 5 Drawing Sheets

(58) Field of Classification Search
USPC .................................... 375/240.01–240.29
See application file for complete search history.

(56) References Cited

U.S. PATENT DOCUMENTS

| | | | |
|---|---|---|---|
| 2018/0241998 | A1 | 8/2018 | Chen et al. |
| 2018/0316918 | A1* | 11/2018 | Drugeon .............. H04N 19/176 |
| 2018/0376165 | A1 | 12/2018 | Alshin et al. |
| 2019/0020895 | A1* | 1/2019 | Liu ...................... H04N 19/176 |
| 2019/0028701 | A1* | 1/2019 | Yu ......................... H04N 19/13 |
| 2019/0045214 | A1* | 2/2019 | Ikai ...................... H04N 19/196 |
| 2019/0320180 | A1* | 10/2019 | Yu ........................ H04N 19/105 |
| 2020/0221122 | A1* | 7/2020 | Ye ........................ H04N 19/103 |
| 2020/0366889 | A1 | 11/2020 | Huang et al. |
| 2021/0029378 | A1* | 1/2021 | He ........................ H04N 19/103 |

OTHER PUBLICATIONS

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.
Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 400 pp.
Chen C., et al., "Description of Core Experiment 4 (CE4): Inter Prediction", JVET-O2024-v3, Joint Video Experts Team (JVET) of ITU-T SG 16 WP 3 and ISO/IEC JTC 1/SC 29/WG 11, JVET-O2024-V3, 15th Meeting: Gothenburg, SE, Jul. 3-12, 2019, pp. 1-12.
Huang K., et al., "CE2-related: Affine Motion Compensation using 2×2 subblock", JVET-N0273, Joint Video Experts Team (JVET) of ITU-T SG 16 WP 3 and ISO/IEC JTC 1/SC 29/WG 11, JVET-N0273, 14th Meeting: Geneva, CH, Mar. 19-27, 2019, pp. 1-3.
JVET: "VTM-5.0, Tags, JVET/VVCSoftware_VTM, GitLab", Frank Bossen, https://vcgit.hhi.fraunhofer.de/jvet/VVCSoftware_VTM/-/tags/VTM-5.0, Accessed Jul. 2019, pp. 1-3.
JVET: "VTM-6.0, Tags, JVET/VVCSoftware_VTM, GitLab", Frank Bossen, https://vcgit.hhi.fraunhofer.de/jvet/VVCSoftware_VTM/-/tags/VTM-6.0 , Accessed Oct. 2019, pp. 1-4.
Luo J., et al., "CE2-Related: Prediction Refinement with Optical Flow for Affine Mode", Joint Video Experts Team (JVET) of ITU-T SG 16 WP 3 and ISO/IEC JTC 1/SC 29/WG 11, Document: JVET-N0236-r5, 14th Meeting: Geneva, CH, Mar. 19-27, 2019, pp. 1-8.
Luo J., et al., "CE4: Prediction refinement with optical flow for affine mode (Test 2.1)", JVET-O0070-v2, Joint Video Experts Team (JVET) of ITU-T SG 16 WP 3 and ISO/IEC JTC 1/SC 29/WG 11, JVET-O0070-V2, 15th Meeting: Gothenburg, SE, Jul. 3-12, 2019, pp. 1-4.
Xiu X., et al., "CE4/9-related: Combined Test of JVET-O0593/JVET-O0252/JVET-O0281/JVET-O0615 on harmonization on BDOF and PROF", JVET-O01142-v2, Joint Video Experts Team (JVET) of ITU-T SG 16 WP 3 and ISO/IEC JTC 1/SC 29/WG 11, JVET-O01142-V2, 15th Meeting: Gothenburg, SE, Jul. 3-12, 2019, pp. 1-5.
Zhang K., et al.,"Non-CE2: Interweaved Prediction for Affine Motion Compensation", JVET-M0268, Joint Video Experts Team (JVET) of ITU-T SG 16 WP 3 and ISO/IEC JTC 1/SC 29/WG 11, JVET-M0268, 13th Meeting: Marrakech, MA, Jan. 9-18, 2019, pp. 1-4.
Zhou M., et al., "CE4-Related: A Clean up for Affine Mode", Joint Video Experts Team (JVET) of ITU-T SG 16 WP 3 and ISO/IEC JTC 1/SC 29/WG 11, JVET-L0047-V1, 12th Meeting: Macao, CN, Oct. 3-12, 2018, pp. 1-9.
International Search Report and Written Opinion—PCT/US2020/026126—ISA/EPO—dated May 25, 2020 (17 pp).
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Ohm J-R., et al., "MPEG-4 Advanced Video Coding", MPEG Doc#: N7314, Jul. 2005, 11 Pages.
Xiu X., et al., "CE4: Harmonization of BDOF and PROF (Test 4-2.1 and 4-2.2)", Joint Video Experts Team (JVET) of ITU-T SG 16 WP 3 and ISO/IEC JTC 1/SC 29/WG 11, JVET-P0057, 16th Meeting: Geneva, CH, Oct. 1-11, 2019, pp. 1-5.
Xiu X., et al., "CE4/9-related: Combined Test of JVET-O0593/JVET-O0252/JVET-O0281/JVET-O0615 on harmonization on BDOF and PROF", Joint Video Experts Team (JVET) of ITU-T SG 16 WP 3 and ISO/IEC JTC 1/SC 29/WG 11, JVET-O01142-V2, 15th Meeting: Gothenburg, SE, Jul. 3-12, 2019, pp. 1-5.
Taiwan Search Report—TW109111388—TIPO—dated Aug. 17, 2023 (1 pp).
Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.
Chen J., et al., "Algorithm Description of Joint Exploration Test Model 5 (JEM 5)," Joint Video Exploration Team (JVET) of ITU-T SG 16 WP 3 and ISO/IEC JTC 1/SC 29/WG 11, 5th Meeting: Geneva, Jan. 12-20, 2017, 44 Pages, URL: http://phenix.int-evry.fr/jvet/, JVET-E1001-v2, Feb. 11, 2017 (Feb. 11, 2017), XP030150648, section 2.2.1.1, section :2.3.8 Bi-directional optical flow "section 2.3.9. decoder-side motion vector refinement".
Ergen S., "ZigBee/IEEE 802.15.4 Summary", Sep. 10, 2004, 37 Pages.
Huang H., et al., "CE2-Related: Simplified Prediction Refinement for Affine Motion Compensation", Joint Video Experts Team (JVET) of ITU-T SG 16 WP 3 and ISO/IEC JTC 1/SC 29/WG 11, Document: JVET-N0504, 14th Meeting: Geneva, CH, Mar. 19-27, 2019, pp. 1-4.
Huang H., et al., "CE4-related: Alignment and simplification of PROF and BDOF", Joint Video Experts Team (JVET) of ITU-T SG 16 WP 3 and ISO/IEC JTC 1/SC 29/WG 11, JVET-O0252, 15th Meeting: Gothenburg, SE, Jul. 3-12, 2019, pp. 1-8.
Huang (Qualcomm) H, et al., "CE4-related: Simplification of PROF and BDOF", 128. MPEG Meeting, Oct. 1, 2019-Oct. 11, 2019, Geneva (Motion Picture Expert Group or ISO/IEC JTC1/SC29/WG11), No. m50039, Sep. 23, 2019 (Sep. 23, 2019), XP030205934, 3 pages, Retrieved from the Internet: URL: http://phenix.int-evry.fr/mpeg/doc_end_user/documents/128_Geneva/wg11/m50039-JVET-P0091-v1-JVET-P0091.zip JVET-P0091.docx, [retrieved on Sep. 23, 2019], abstract, section "Introduction", section "Proposed".
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
"Information technology—Dynamic Adaptive Streaming over HTTP {DASH}—Part 1: Media Presentation Description and Segment Formats," ISO/IEC 23009-1, International Standard, Draft third edition, Jan. 9, 2017, 216 pp.
Chen J., et al., "Algorithm Description of Joint Exploration Test Model 7 (JEM7)", 119 . MPEG Meeting, 7. JVET. Meeting, Jul. 13, 2017- Jul. 21, 2017, JVET-G1001-V1, Joint Video Exploration Team (JVET) of ITU-T SG 16 WP3 and ISO/ IEC JTC 1/SC 29/WG 11, No. m41357, No. G1001_v1, JVET-G1001, 7th Meeting, Jul. 13, 2017-Jul. 21, 2017, Torino, IT,. N17055, Aug. 19, 2017, XP030150980, XP030023716, 50 Pages.

\* cited by examiner

GRADIENT-BASED PREDICTION REFINEMENT FOR VIDEO CODING

This application claims the benefit of U.S. Provisional Application 62/827,677, filed Apr. 1, 2019 and U.S. Provisional Application 62/837,405 filed Apr. 23, 2019, the entire content of each of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for gradient-based prediction refinement. A video coder (e.g., video encoder or video decoder) determines one or more prediction blocks for inter-predicting a current block (e.g., based on one or more motion vectors for the current block). In gradient-based prediction refinement, the video coder modifies one or more samples of the prediction block based on various factors such as displacement in a horizontal direction, the horizontal gradient, a displacement in the vertical direction, and a vertical gradient.

For example, a motion vector identifies the prediction block. The displacement in the horizontal direction (also called horizontal displacement) refers to a change (e.g., delta) in the x-coordinate of the motion vector, and the displacement in the vertical direction (also called vertical displacement) refers to a change in (e.g., delta) in the y-coordinate. The horizontal gradient refers to a result of applying a filter to a first set of samples in the prediction block, and the vertical gradient refers to a result of applying the filter to a second set of samples in the prediction block.

Example techniques described in disclosure provide for gradient-based prediction refinement where a precision level of the displacement (e.g., at least one of the horizontal or vertical displacement) is unified (e.g., the same) for different prediction modes. For example, for a first prediction mode (e.g., affine mode), the motion vectors may be at a first precision level, and for a second prediction mode (e.g., bi-directional optical flow (BDOF)), the motion vectors may be at a second precision level. Accordingly, the vertical and horizontal displacements for the motion vectors used for affine mode and motion vectors used for BDOF may be different. In this disclosure, the video coder may be configured to round (e.g., round up or round down) the vertical and horizontal displacements for the motion vectors so that the precision level of the displacements is the same regardless of the prediction mode (e.g., the vertical and horizontal displacements for affine mode and BDOF have the same precision level).

By rounding the precision level of the displacement, the example techniques may improve the overall operation of the video coder. For instance, gradient-based prediction refinement involves multiplication and shift operations. If the precision levels of the displacements are different for different modes, then different logic circuitry may be needed to support the different precision levels (e.g., logic circuitry configured for one precision level may not be suitable for other precision levels). Because the precision levels for the displacements is the same for the different modes, the same logic circuitry can be reused for the blocks, resulting in smaller overall logic circuitry and reduced power consumption due to not needing to power unused logic circuitry.

In some examples, the techniques to determine the displacement may be based on already available information at the video decoder. For instance, the manner in which the video decoder determines the horizontal or vertical displacement may be based on information that was available to the video decoder to inter-predict the current block in accordance with the inter-prediction mode. Moreover, there may be certain inter-prediction modes that are disabled for certain block types (e.g., based on size). In some examples, these inter-prediction modes that were disabled for certain block types may be enabled for these block types but the prediction blocks for such blocks may be modified using example techniques described in this disclosure.

In one example, the disclosure describes a method of decoding video data, the method comprising determining a prediction block for inter-predicting a current block, determining horizontal and vertical displacements for gradient-based prediction refinement of one or more samples of the prediction block, rounding the horizontal and vertical displacements to a precision level that is the same for different inter-prediction modes, determining one or more refinement offsets based on the rounded horizontal and vertical displacements, modifying the one or more samples of the prediction block based on the determined one or more refinement offsets to generate a modified prediction block, and reconstructing the current block based on the modified prediction block.

In one example, the disclosure describes a method of encoding video data, the method comprising determining a prediction block for inter-predicting a current block, determining horizontal and vertical displacements for gradient-based prediction refinement of one or more samples of the prediction block, rounding the horizontal and vertical displacements to a precision level that is the same for different inter-prediction modes, determining one or more refinement offsets based on the rounded horizontal and vertical displacements, modifying the one or more samples of the prediction block based on the determined one or more refinement offsets to generate a modified prediction block, determining residual values indicative of a difference between the current block and the modified prediction block, and signaling information indicative of the residual values.

In one example, the disclosure describes a device for coding video data, the device comprising a memory configured to store one or more samples of a prediction block and processing circuitry. The processing circuitry is configured to determine the prediction block for inter-predicting a current block, determine horizontal and vertical displacements for gradient-based prediction refinement of the one or more samples of the prediction block, round the horizontal and vertical displacements to a precision level that is the same for different inter-prediction modes, determine one or more refinement offsets based on the rounded horizontal and vertical displacements, modify the one or more samples of the prediction block based on the determined one or more refinement offsets to generate a modified prediction block, and code the current block based on the modified prediction block.

In one example, the disclosure describes a computer-readable storage medium storing instructions thereon that when executed cause one or more processors to determine a prediction block for inter-predicting a current block, determine horizontal and vertical displacements for gradient-based prediction refinement of one or more samples of the prediction block, round the horizontal and vertical displacements to a precision level that is the same for different inter-prediction modes, determine one or more refinement offsets based on the rounded horizontal and vertical displacements, modify the one or more samples of the prediction block based on the determined one or more refinement offsets to generate a modified prediction block, and code the current block based on the modified prediction block.

In one example, the disclosure describes a device for coding video data, the device comprising means for determining a prediction block for inter-predicting a current block, means for determining horizontal and vertical displacements for gradient-based prediction refinement of one or more samples of the prediction block, means for rounding the horizontal and vertical displacements to a precision level that is the same for different inter-prediction modes, means for determining one or more refinement offsets based on the rounded horizontal and vertical displacements, means for modifying the one or more samples of the prediction block based on the determined one or more refinement offsets to generate a modified prediction block, and means for coding the current block based on the modified prediction block.

The details of one or more examples are set forth in the accompanying drawings and the description below. Other features, objects, and advantages will be apparent from the description, drawings, and claims.

DETAILED DESCRIPTION

Figure 1:
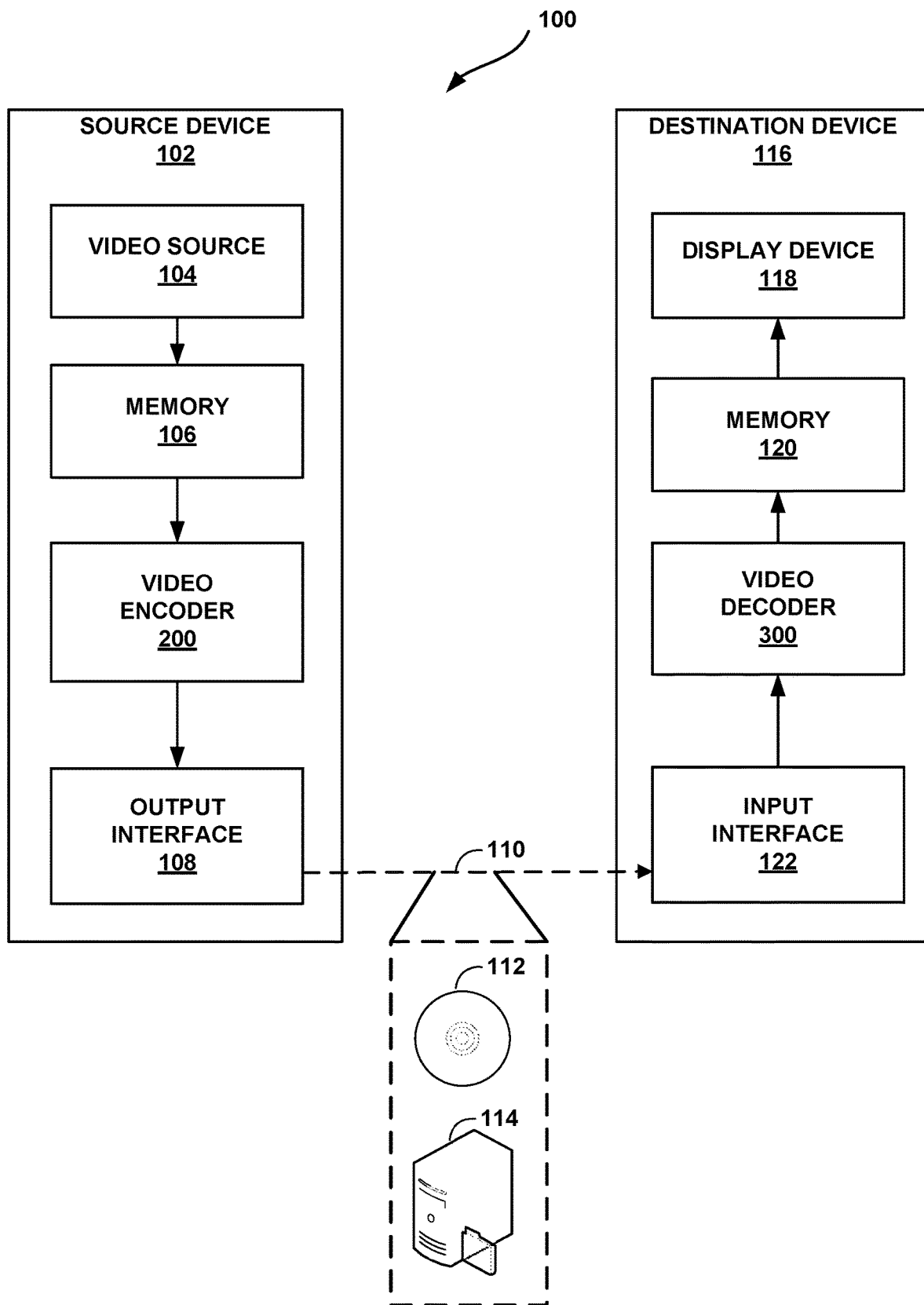
FIG. 1 is a block diagram illustrating an example video encoding and decoding system that may perform the techniques of this disclosure.

This disclosure relates to gradient-based prediction refinement. In gradient-based prediction refinement, a video coder (e.g., video encoder or video decoder) determines a prediction block for a current block based on a motion vector as part of inter-prediction, and modifies (e.g., refines) samples of a prediction block to generate modified prediction samples (e.g., refined prediction samples). A video encoder signals residual values indicative of a difference between the modified prediction samples and the current block. A video decoder performs the same operations that the video encoder performed to modify the samples of the prediction block to generate modified prediction samples. The video decoder adds the residual values to the modified prediction samples to reconstruct the current block.

One example way to modify the samples of the prediction block is for the video coder to determine one or more refinement offsets and add the samples of the prediction block to the refinement offsets. One example way to generate the refinement offsets is based on gradients and motion vector displacements. The gradients may be determined from gradient filters applied to the samples of the prediction block.

Examples of the motion vector displacements include horizontal displacement to the motion vector and vertical displacement to the motion vector. The horizontal displacement may be a value that is added to or subtracted from the x-coordinate of the motion vector, and the vertical displacement may be a value that is added to or subtracted from the y-coordinate of the motion vector. For example, the horizontal displacement may be referred to as $\Delta v_x$, where $v_x$ is the x-coordinate of the motion vector, and the vertical displacement may be referred to as $\Delta v_y$, where $v_y$ is the y-coordinate of the motion vector.

The precision level of the motion vector of the current block may be different for different inter-prediction modes. For example, the coordinate of a motion vector (e.g., x- or y-coordinate) includes an integer part and may include a decimal part. The decimal part is referred to as the sub-pel part of the motion vector since the integer part of the motion vector identifies an actual pixel in the reference picture that includes the prediction block, and the sub-pel part of the motion vector adjusts the motion vector to identify a location in between pixels in the reference picture.

The precision level of the motion vector is based on the based on the sub-pel part of the motion vector and is indicative of the granularity of the movement of the motion vector from an actual pixel in the reference picture. As an example, if the sub-pel part of the x-coordinate is 0.5, then the motion vector is halfway between two horizontal pixels in the reference picture. If the sub-pel part of the x-coordinate is 0.25, then the motion vector is a quarter of the way between two horizontal pixels, as so forth. In these examples, the precision level of the motion vector may be equal to the sub-pel part (e.g., precision level is 0.5, 0.25, and so forth).

In some examples, the precision level of the horizontal and vertical displacements may be based on the precision level of the motion vector or the way in which the motion vector was generated. For instance, in some examples, such as merge mode, which is a form of inter-prediction mode, the sub-pel part of the x- and y-coordinates of the motion vector may be the horizontal and vertical displacements, respectively. As another example, such as for affine mode, which is a form of inter-prediction, the motion vector may be based on corner point motion vectors, and the horizontal and vertical displacements may be determined based on the corner point motion vectors.

The precision level of the horizontal and vertical displacements may be different for different inter-prediction modes. For instance, for some inter-prediction modes, the horizontal and vertical displacements may be more precise (e.g., precision level is $1/128$ for a first prediction mode) as compared to other inter-prediction modes (e.g., precision level is $1/16$ for a second prediction mode).

In implementation, a video coder may need to include different logic circuitry to handle the different precision levels. Performing gradient-based prediction refinement includes multiplication, shift operation, addition, and other arithmetic operations. Logic circuitry configured for one precision level for horizontal or vertical displacements may not be able to process horizontal and vertical displacements of a higher precision level. Therefore, some video coders include one set of logic circuitry for performing gradient-based prediction refinement for one inter-prediction mode where the horizontal and vertical displacements have a first precision level and different set of logic circuitry for performing gradient-based prediction refinement for another inter-prediction mode where the horizontal and vertical displacements have a second precision level.

However, having different logic circuitry for performing gradient-based prediction refinement for different inter-prediction modes results in additional logic circuitry that increases the size of the video coder, as well as utilizes additional power. For example, if a current block is inter-predicted in a first mode, then a first set of logic circuitry for gradient-based prediction refinement is used. However, a second set of logic circuitry for gradient-based prediction refinement for a different inter-prediction mode is still receiving power.

This disclosure describes examples of techniques for rounding the precision level for the horizontal and vertical displacements to a same precision level for different inter-prediction modes. For example, a video coder may round a first displacement (e.g., first horizontal or first vertical displacement) having a first precision level for a first block inter-predicted in a first inter-prediction mode to a set precision level, and may round a second displacement (e.g., second horizontal or second vertical displacement) having a second precision level for a second block inter-predicted in a second inter-prediction mode to the same set precision level. Stated another way, the video coder may round at least one of the horizontal and the vertical displacements to a precision level that is same for different inter-prediction modes. As one example, the first inter-prediction mode may be affine mode, and the second inter-prediction mode may be bi-directional optical flow (BDOF).

In this way, the same logic circuitry can be used for gradient-based prediction refinement for different inter-prediction modes, rather than having different logic circuitry for different inter-prediction modes. For instance, the logic circuitry of the video coder may be configured to perform gradient-based prediction refinement for horizontal and vertical displacements having a set precision level. The video coder may round the horizontal and vertical displacements such that the precision level of the rounded horizontal and vertical displacements is equal to the set precision level, allowing the same logic circuitry to perform gradient-based prediction refinement for different inter-prediction modes.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, tablet computers, set-top boxes, telephone handsets such smartphones, televisions, cameras, display devices, digital media players, video gaming consoles, video streaming device, a broadcast receiver device, a set-top box, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for gradient-based prediction refinement. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for gradient-based prediction refinement. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, 9-18 Jan. 2019, JVET-M1001-v5 (hereinafter "VVC Draft 4"). A more recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17th Meeting: Brussels, BE, 7-17 Jan. 2020, JVET-Q2001-vD (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual values. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three subblocks. In some examples, a triple tree partition divides a block into three subblocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual values for the block. The residual values, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may be configured to perform gradient-based prediction refinement. As described above, as part of inter-predicting a current block, video encoder 200 and video decoder 300 may determine one or more prediction blocks (e.g., based on one or more motion vectors) for the current block. In gradient-based prediction refinement, video encoder 200 and video decoder 300 modify one or more samples (e.g., including all samples) of the prediction block.

For example, in gradient-based prediction refinement, the inter-prediction sample (e.g., sample of prediction block) at location (i,j) is refined by an offset $\Delta I(i,j)$ that is derived by a displacement at horizontal direction, the horizontal gradient, a displacement at vertical direction, and the vertical gradient at location (i,j). In one example, the prediction refinement is described as: $\Delta I(i,j)=g_x(i,j)*\Delta v_x(i,j)+g_y(i,j)*\Delta v_y(i,j)$, where $g_x(i,j)$ is the horizontal gradient, $g_y(i,j)$ is the vertical gradient, $\Delta v_x(i,j)$ is the displacement at horizontal direction and $\Delta v_y(i,j)$ is the displacement at vertical direction.

The gradient of an image is a measure of a directional change in the intensity or color in an image. For instance, the gradient value is based on the rate of change in the color or intensity in the direction with the largest change in the color or intensity based on neighboring samples. As one example, the gradient value is larger if the rate of change is relatively high than if the rate of change is relatively low.

Furthermore, the prediction block for the current block may be a reference picture that is different than the current picture that includes the current block. Video encoder 200 and video decoder 300 may determine the offset (e.g., $\Delta I(i,j)$) based on sample values in the reference picture (e.g., the gradient is determined based on sample values in the reference picture). In some examples, the values used to determine the gradient may be values within the prediction block itself or values generated based on values of the prediction block (e.g., interpolated, rounded, etc. values generated from values within the prediction block). Also, in some examples, the values used to determine the gradient may be external to the prediction block and within the reference picture or generated (e.g., interpolated, rounded, etc.) from samples external to the prediction block and within the reference picture.

However, in some examples, video encoder 200 and video decoder 300 may determine the offset based on sample values in the current picture. In some examples, such as intra-block copy, the current picture and the reference picture are the same picture.

The displacement (e.g., vertical and/or horizontal displacement) may be determined based on the inter-prediction mode. In some examples, the displacement is determined based on the motion parameters. As described in more detail, for decoder side motion refinement mode, the displacement may be based on the samples in the reference picture. For other inter-prediction modes, the displacement may not be based on samples in the reference picture, but the example techniques are not so limited, and samples in the reference picture may be used for determining the displacement. There may be various ways in which to determine the vertical and/or horizontal displacements, and the techniques are not limited to a particular way in which to determine the vertical and/or horizontal displacements.

The following describes example ways in which to perform gradient calculation. For example, for the gradient filter, in one example, the Sobel filter can be used for gradient calculation. The gradients are calculated as follows: $g_x(i,j)=I(i+1, j-1)-I(i-1, j-1)+2*I(i+1,j)-2*I(i-1,j)+I(i+1, j+1)-I(i-1,j+1)$ and $g_y(i,j)=I(i-1,j+1)-I(i-1,j-1)+2*I(i,j+1)-2*I(i,j-1)+I(i+1,j+1)-I(i+1,j-1)$.

In some examples, [1, 0, −1] filter is applied. The gradients may be calculated as follows: $g_x(i,j)=I(i+1,j)-I(i-1,j)$ and $g_y(i,j)=I(i,j+1)-I(i,j-1)$. In some examples, other gradient filter, Canny filter for example, can be applied.

For gradient normalization, the calculated gradients may be normalized before being used in refinement offset derivation (e.g., before calculating $\Delta I$), or the normalization can be done after the refinement offset derivation. Rounding process may be applied during the normalization. For example, if the [1, 0, −1] filter is applied, the normalization is performed by adding one to the input value and then right shift by one. If the input is scaled by two to the power of N, then the normalization is performed by adding 1<<N and then right shift by (N+1).

For gradient at the boundary, the gradients at the boundary of a prediction block may be calculated by extending the prediction block by S/2 at each boundary, where S is the filtering step for gradient calculation. In one example, the extended prediction samples are generated by using the same motion vector as the prediction block for inter-prediction (motion compensation). In some examples, the extended prediction samples are generated by using the same motion vector but using a shorter filter for the interpolation process in motion compensation. In some examples, the extended prediction samples are generated by using the rounded motion vector for integer motion compensation. In some examples, the extended prediction samples are generated by padding, where the padding is performed by copying the boundary samples. In some examples, if the prediction block is generated by subblock based motion compensation, the extended prediction samples are generated by using the motion vector of the nearest subblock. In some examples, if the prediction block is generated by subblock based motion compensation, the extended prediction samples are generated by using one representative motion vector. In one example, the representative motion vector can be the motion vector at the center of the prediction block. In one example, the representative motion vector can be derived by averaging the motion vectors of boundary subblocks.

Subblock based gradient derivation may be applied to facilitate parallel processing or pipeline friendly design in hardware. The width and height of the subblock, denoted as sbW and sbH, can be determined as follows: sbW=min (blkW, SB_WIDTH) and sbH=min(blkH, SB_HEIGHT). In this equation, blkW and blkH are the width and height of the prediction block, respectively. SB_WIDTH and SB_HEIGHT are two predetermined variables. In one example, SB_WIDTH and SB_HEIGHT are both equal to 16.

For the horizontal and vertical displacements, the horizontal and vertical displacements $\Delta v_x(i,j)$ and $\Delta v_y(i,j)$ that are used in the refinement derivation can be determined depending on the inter-prediction mode, in some examples. However, the example techniques are not limited to the determining horizontal and vertical displacements based on the inter-prediction mode.

For small block size inter-mode (e.g., small sized blocks that are inter-predicted), to reduce worst-case memory bandwidth, inter-prediction mode for small block may be disabled or constrained. For example, inter-prediction for 4×4 block or smaller is disabled, bi-directional prediction for 4×8, 8×4, 4×16, and 16×4 may be disabled. The memory bandwidth may be increased due to the interpolation process for those small blocks. The integer motion compensation, without interpolation, can still be applied to those small blocks without increasing the worst-case memory bandwidth.

In one or more example techniques, inter-prediction may be enabled for some or all those small blocks but with integer motion compensation and gradient-based prediction refinement. A motion vector is first rounded to integer motion vector for motion compensation. Then the remaining of the rounding, i.e. sub-pel part of the motion vector, is used as $\Delta v_x(i,j)$ and $\Delta v_y(i,j)$ for gradient-based prediction refinement. For example, if a motion vector for a small block is (2.25, 5.75), then integer motion vector used for motion compensation would be (2, 6), and the horizontal displacement (e.g., $\Delta v_x(i,j)$) would 0.25, and the vertical displacement (e.g., $\Delta v_y(i,j)$) would be 0.75. In this example, the precision level of the horizontal and vertical displacement is 0.25 (or ¼). For example, the horizontal and vertical displacements can be incremented in steps of 0.25.

In some examples, for small block size inter-mode, gradient-based prediction refinement may be available but only if the small sized block is inter-predicted in merge mode. Examples of merge mode are described below. In some examples, for small size inter-mode, gradient-based prediction refinement may be disabled for blocks having integer motion mode. In integer motion mode, one or more motion vectors (e.g., signaled motion vectors) are integers. In some examples, even for larger sized blocks, if the blocks are inter-predicted in integer motion mode, gradient-based prediction refinement may be disabled for such blocks.

For a normal merge mode, which is an example of an inter-prediction mode, where the motion information is derived from spatial or temporal neighboring coded blocks, $\Delta v_x(i,j)$ and $\Delta v_y(i,j)$ can be the remaining of the motion vector rounding process (e.g., similar to the above example of motion vector (2.25, 5.75)). In one example, the temporal motion vector predictor is derived by scaling the motion vector in the temporal motion buffer according to the picture order count different between current picture and reference pictures. A rounding process may be performed to round the scaled motion vector to certain precision. The remaining can be used as $\Delta v_x(i,j)$ and $\Delta v_y(i,j)$. The precision of the remaining (i.e., the precision level of the horizontal and vertical displacements) can be predefined and may be higher than that of motion vector prediction. For example, if the motion vector precision is 1/16, the remaining precision is 1/(16*MaxBlkSize), where MaxBlkSize is the maximum block size. Stated another way, the precision level for the horizontal and vertical displacements (e.g., $\Delta v_x$ and $\Delta v_y$) is 1/(16*MaxBlkSize).

For a merge with motion vector difference (MMVD) mode, which is an example of an inter-prediction mode, a motion vector difference is signaled together with merge index to represent the motion information. In some techniques, motion vector difference (e.g., the difference between the actual motion vector and a motion vector predictor) has the same precision of the motion vector. In one or more examples described in this disclosure, the motion vector difference may be allowed to have higher precision. The signaled motion vector difference is first rounded to the motion vector precision and the motion vector indicated by merge index is added to generate the final motion vector for motion compensation. In one or more examples, the remaining part after the rounding (e.g., the difference between the rounded value of the motion vector difference and the original value of the motion vector difference) may be used as the horizontal and vertical displacements (e.g., used as $\Delta v_x(i,j)$ and $\Delta v_y(i,j)$) for gradient-based prediction refinement. In some examples, $\Delta v_x(i,j)$ and $\Delta v_y(i,j)$ can be signaled as candidates of motion vector difference.

For a decoder side motion vector refinement mode, motion compensation using the original motion vectors is performed to generate the original bi-prediction blocks and the difference between the list 0 and list 1 predictions is calculated, denoted as DistOrig. List 0 refers to a first reference picture list (RefPicList0) that includes a list of reference pictures that can potentially be used for inter-prediction. List 1 refers to a second reference picture list (RefPicList1) that includes a list of reference pictures that can potentially be used for inter-prediction. Then the motion vectors at list 0 and list 1 are rounded to the nearest integer positions. That is, the motion vector that refers to a picture in list 0 is rounded to the nearest integer position, and the motion vector that refers to a picture in list 1 is rounded to the nearest integer position. A search algorithm is used to search in a range of integer displacements to find the pair of displacements that has the smallest distortion, DistNew, between a block of picture identified in list 0 prediction and a block of picture identified in list 1 using the new integer motion vectors for motion compensation. If DistNew is less than DistOrig, the new integer motion vectors are fed into bi-directional optical flow (BDOF) to derive the $\Delta v_x(i,j)$ and $\Delta v_y(i,j)$ for prediction refinement at both list 0 and list 1 prediction. Otherwise, BDOF is performed on the original list 0 and list 1 predictions for prediction refinement.

For an affine mode, the motion field can be derived for each pixel (e.g., a motion vector can be determined on a per-pixel basis). However, 4×4 based motion field is used for affine motion compensation to reduce the complexity and memory bandwidth. For example, rather than determining a motion vector on a per-pixel basis, a motion vector is determined for subblocks, where one subblock is 4×4, as one example. Some other subblock sizes, 4×2, 2×4, or 2×2 for examples, may also be used. In one or more examples, gradient-based prediction refinement may be used to improve the affine motion compensation. The gradient of the block can be calculated as described above. Given the affine motion model:

$$\begin{cases} v_x = ax + by + e \\ v_y = cx + dy + f \end{cases},$$

where a, b, c, d, e, and f are values determined by video encoder 200 and video decoder 300 based on control point motion vectors and length and width of the block, as a few examples. The values for a, b, c, d, e, and f may be signaled in some examples.

The following describes some examples ways of determining a, b, c, d, e, and f. In a video coder (e.g., video encoder 200 or video decoder 300), a picture is partitioned into subblocks for block-based coding, in affine mode. The affine motion model for a block can also be described by the three motion vectors (MVs) $\vec{v}_0 = (v_{0x}, v_{0y})$, $\vec{v}_1 = (v_{1x}, v_{1y})$, and $\vec{v}_2 = (v_{2x}, v_{2y})$ at three different locations that are not in the same line. The three locations are usually referred to as control-points, and the three motion vectors are referred to as control-point motion vectors (CPMVs). In the case when the three control-points are at the three corners of the block, the affine motion can be described as $$\begin{cases} v_x = \frac{(v_{1x} - v_{0x})}{blkW}x + \frac{(v_{2x} - v_{0x})}{blkH}y + v_{0x} \\ v_y = \frac{(v_{1y} - v_{0y})}{blkW}x + \frac{(v_{2y} - v_{0y})}{blkH}y + v_{0y} \end{cases}$$

where blkW and blkH are the width and height of the block.

For affine mode, video encoder 200 and video decoder 300 may determine a motion vector for each subblock using the representative coordinate of the subblock (e.g., center position of the subblock). In one example, the block is partitioned into non-overlapping subblocks. The block width is blkW, block height is blkH, the subblock width is sbW and subblock height is sbH, then there are blkH/sbH rows of subblocks and blkW/sbW subblocks in each row. For a six-parameter affine motion model, the motion vector for the subblock (referred to as subblock MV) at $i_{th}$ row (0<=i<blkW/sbW) and $j_{th}$ (0<=j<blkH/sbH) column is derived as $$\begin{cases} v_x = \frac{(v_{1x} - v_{0x})}{blkW}\left(j*sbW + \frac{sbW}{2}\right) + \frac{(v_{2x} - v_{0x})}{blkH}\left(i*sbH + \frac{sbH}{2}\right) + v_{0x} \\ v_y = \frac{(v_{1y} - v_{0y})}{blkW}\left(j*sbW + \frac{sbW}{2}\right) + \frac{(v_{2y} - v_{0y})}{blkH}\left(i*sbH + \frac{sbH}{2}\right) + v_{0y} \end{cases}$$

From the above equation, variables a, b, c, d, e, and f may be defined as follows:

$$a = \frac{(v_{1x} - v_{0x})}{blkW}$$

$$b = \frac{(v_{2x} - v_{0x})}{blkH}$$

$$c = \frac{(v_{1y} - v_{0y})}{blkW}$$

$$d = \frac{(v_{2y} - v_{0y})}{blkH}$$

$$e = v_{0x}$$

$$f = v_{0y}$$

For affine mode, which is an example of an inter-prediction mode, video encoder 200 and video decoder 300 may determine the displacement (e.g., horizontal or vertical displacements) by at least one of the following methods. The following are examples and should not be considered limiting. There may be other ways in which video encoder 200 and video decoder 300 may determine the displacement (e.g., horizontal or vertical displacements) for affine mode.

For a 4×4 subblock based affine motion compensation, for 2×2 based displacement derivation, the displacements in each 2×2 subblock are the same. In each 4×4 subblock, the $\Delta v(i,j)$ for the four 2×2 subblocks within the 4×4 are calculated as follows:

Top-left 2×2: $\begin{cases} \Delta v_x(i, j) = -a - b \\ \Delta v_y(i, j) = -c - d \end{cases}$ Top-right 2×2: $\begin{cases} \Delta v_x(i, j) = a - b \\ \Delta v_y(i, j) = c - d \end{cases}$ Bottom-left 2×2: $\begin{cases} \Delta v_x(i, j) = -a + b \\ \Delta v_y(i, j) = -c + d \end{cases}$ Bottom-right 2×2: $\begin{cases} \Delta v_x(i, j) = a + b \\ \Delta v_y(i, j) = c + d \end{cases}$ For 1×1 displacement derivation, the displacements are derived for each sample. The coordinate of the top-left sample in the 4×4 may be (0,0), in which case, $\Delta v(i,j)$ is derived as:

$$\begin{cases} \Delta v_x(i, j) = ((2*i - 3)*a + (2*j - 3)*b)/2 \\ \Delta v_y(i, j) = ((2*i - 3)*c + (2*j - 3)*d)/2 \end{cases}$$

In some examples, the division by 2, which is implemented as a right shift operation, can be moved to the refinement offset calculation. For example, rather than performing the division by 2 operation when deriving the horizontal and vertical displacements (e.g., $\Delta v_x$ and $\Delta v_y$), video encoder 200 and video decoder 300 may perform the division by 2 operation as part of determining $\Delta I$ (e.g., the refinement offset).

For 4×2 subblock based affine motion compensation, the motion field for motion vector storage is still 4×4; however, the affine motion compensation is 4×2. The motion vector (MV) for the 4×4 subblock may be $(v_x, v_y)$, in which case, the MV for motion compensation of the left 4×2 is $(v_x-a, v_y-c)$, and the MV for motion compensation of the left 4×2 is $(v_x+a, v_y+c)$.

For 2×2 based displacement derivation, in 2×2 based displacement derivation, the displacements in each 2×2 subblock are the same. In each 4×2 subblock, the Δv(i,j) for the 2 2×2 subblocks within the 4×4 are calculated as follows:

$$\text{Top } 2 \times 2: \begin{cases} \Delta v_x(i, j) = -b \\ \Delta v_y(i, j) = -d \end{cases}$$

$$\text{bottom } 2 \times 2: \begin{cases} \Delta v_x(i, j) = b \\ \Delta v_y(i, j) = d \end{cases}$$

For 1×1 displacement derivation, the displacements are derived for each sample. Let the coordinate of the top-left sample in the 4×2 be (0,0), Δv (i,j) be derived as:

$$\begin{cases} \Delta v_x(i, j) = ((2*i-1)*a + (2*j-3)*b)/2 \\ \Delta v_y(i, j) = ((2*i-1)*c + (2*j-3)*d)/2 \end{cases}$$

The division by 2, which may be implemented as a right shift operation, can be moved to the refinement offset calculation. For example, rather than performing the division by 2 operation when deriving the horizontal and vertical displacements (e.g., $\Delta v_x$ and $\Delta v_y$), video encoder 200 and video decoder 300 may perform the division by 2 operation as part of determining ΔI (e.g., the refinement offset).

For 2×4 subblock based affine motion compensation, the motion field for motion vector storage is still 4×4; however, the affine motion compensation is 2×4. The MV for the 4×4 subblock may be $(v_x, v_y)$, in which case, the MV for motion compensation of the left 4×2 is $(v_x-b, v_y-d)$, and the MV for motion compensation of the left 4×2 is $(v_x+b, v_y+d)$.

For 2×2 based displacement derivation, the displacements in each 2×2 subblock are the same. In each 2×4 subblock, the Δv(i,j) for the 2 2×2 subblocks within the 2×4 are calculated as follows:

$$\text{Left } 2 \times 2: \begin{cases} \Delta v_x(i, j) = -a \\ \Delta v_y(i, j) = -c \end{cases}$$

$$\text{right } 2 \times 2: \begin{cases} \Delta v_x(i, j) = a \\ \Delta v_y(i, j) = c \end{cases}$$

For 1×1 displacement derivation, in 1×1 based displacement derivation, the displacements are derived for each sample. The coordinate of the top-left sample in the 2×4 may be (0,0), in which case, Δv(i,j) be derived as:

$$\begin{cases} \Delta v_x(i, j) = ((2*i-3)*a + (2*j-1)*b)/2 \\ \Delta v_y(i, j) = ((2*i-3)*c + (2*j-1)*d)/2 \end{cases}$$

The division by 2, which may be implemented as a right shift operation, can be moved to the refinement offset calculation. For example, rather than performing the division by 2 operation when deriving the horizontal and vertical displacements (e.g., $\Delta v_x$ and $\Delta v_y$), video encoder 200 and video decoder 300 may perform the division by 2 operation as part of determining ΔI (e.g., the refinement offset).

The following describes precision of displacements and gradient. In some examples, the same precision for the horizontal and vertical displacement may be used in all modes. The precision may be predefined or signaled in high level syntax. Therefore, if horizontal and vertical displacements are derived from different modes having different precision, the horizontal and vertical displacements are rounded to the predefined precision. Examples of predefined precision are: ¼, ⅛, 1/16, 1/32, 1/64, 1/128, etc.

As described above, the precision, also called precision level, may be indicative of how precise the horizontal and vertical displacements (e.g., $\Delta v_x$ and $\Delta v_y$) are, where the horizontal and vertical displacements may be determined using one or more examples described above or using some other techniques. In general, the precision level is defined as decimal (e.g., 0.25, 0.125, 0.0625, 0.03125, 0.015625, 0.0078125, etc.) or fraction (e.g., ¼, ⅛, 1/16, 1/32, 1/64, 1/128, etc.). For example, for ¼ precision level, the horizontal or vertical displacements may be represented with increments of 0.25 (e.g., 0.25, 0.5, or 0.75). For ⅛ precision level, the horizontal and vertical displacements may be represented with increments of 0.125 (e.g., 0.125, 0.25, 0.325, 0.5, 0.625, 0.75, or 0.825). As can be seen, the lower the numerical value of the precision level (e.g., ⅛ is smaller than ¼), the more granularity there is for the increments and the more precise a value can be presented (e.g., for ¼ precision level, the displacements are rounded to the nearest fourth, but for ⅛ precision level, the displacements are rounded to the nearest eighth).

Because the horizontal and vertical displacements can have different precision levels for different inter-prediction modes, video encoder 200 and video decoder 300 may be configured to include different logic circuitry to perform gradient-based prediction refinement for the different inter-prediction modes. As described above, to perform gradient-based prediction refinement, video encoder 200 and video decoder 300 may perform the following operations: $g_x(i,j) * \Delta v_x(i,j) + g_y(i,j) * \Delta v_y(i,j)$, where $g_x$ and $g_y$ are a first gradient-based on a first set of samples of samples of the prediction block and a second gradient-based on a second set of samples of samples of the prediction block, respectively, and $\Delta v_x$ and $\Delta v_y$ are horizontal and vertical displacements, respectively. As can be seen, for gradient-based prediction refinement, video encoder 200 and video decoder 300 may need to perform multiplication and addition operations, as well as utilize memory to store temporary results used in the computation.

However, the ability of logic circuitry (e.g., multiplier circuitry, adder circuitry, memory register) to perform the mathematical operations may be limited to the precision level that the logic circuitry is configured for. For example, logic circuitry is configured for a first precision level may not be able to perform operations needed for gradient prediction refinement where the horizontal or vertical displacement is at a more precise second precision level.

Accordingly, some techniques utilize different sets of logic circuitry configured for different precision levels to perform gradient-based prediction refinement for different inter-prediction modes. For example, a first set of logic circuitry may be configured to perform gradient-based prediction refinement for inter-prediction modes where the horizontal and/or vertical displacement is 0.25, and a second set of logic circuitry may be configured to perform gradient-based prediction refinement for inter-prediction modes where the horizontal and/or vertical displacement is 0.125. Having these different sets of circuitry increases the overall size of video encoder 200 and video decoder 300, as well as potentially waste power.

In some examples described in this disclosure, the same gradient calculation process may be used for all inter-prediction modes. Stated another way, the same logic circuitry may be used to perform gradient-based prediction refinement for different inter-prediction modes. For example, the precision of gradient may be kept the same for the prediction refinement in all inter-prediction modes. In some examples, for the precision of displacements and gradients, the example techniques may ensure that the same (or unified) prediction refinement process can be applied to different modes, and the same prediction refinement module can be applied to different modes.

As an example, video encoder 200 and video decoder 300 may be configured to round at least one of the horizontal and the vertical displacements to a precision level that is same for different inter-prediction modes. For instance, if the precision level to which the horizontal and vertical displacements are rounded to is 0.015625 ($\frac{1}{64}$), then if the precision level of the horizontal and/or vertical displacements is $\frac{1}{4}$ for one inter-prediction mode, then the precision level of the horizontal and/or vertical displacement is rounded to $\frac{1}{64}$. If the precision level of the horizontal and/or vertical displacements is $\frac{1}{128}$, then the precision level of the horizontal and/or vertical displacement is rounded to $\frac{1}{64}$.

In this way, the logic circuitry for gradient-based prediction refinement can be reused for different inter-prediction modes. For instance, in the above example, video encoder 200 and video decoder 300 may include logic circuitry for precision level of 0.125, and this logic circuitry can be reused for the different inter-prediction modes because the precision level of the horizontal and/or vertical displacements are rounded to 0.125.

In some examples, when rounding is not performed in accordance with techniques described in this disclosure, the logic circuitry for multiplication and accumulation type operations may be reused if the logic circuitry is designed to have a relatively high-level precision (e.g., logic circuitry designed for a particular precision level for multiplication can process multiplication operations for values of a lower precision level). However, for shift operations, logic circuitry designed for a particular precision may not be able to process shift operations for values of a lower precision level. With the example techniques described in this disclosure, with the rounding techniques described, it may be possible to reuse the logic circuitry including for shift operations for the different inter-prediction modes.

In one example, the prediction refinement offset is derived as:

$$\Delta I(i,j)=(g_x(i,j)*\Delta v_x(i,j)+g_y(i,j)*\Delta v_y(i,j)+\text{offset})>>\text{shift}$$

In the above equation, offset is equal to 1<<(shift−1), and shift is determined by the predefined precision of displacement and gradient and is fixed for different modes. In some examples, offset is equal to 0.

In some examples, the mode may include one or more of the modes described above with respect to horizontal and vertical displacements, such as small block size inter mode, normal merge mode, merge with motion vector difference, decoder side motion vector refinement mode, and affine mode. The mode may also include the Bi-Directional Optical Flow (BDOF).

There may be separate refinement for each prediction direction. For example, in the case of bi-directional prediction, prediction refinement may be performed separately for each prediction direction. The result of refinement may be clipped to a certain range to ensure the same bit-width as the prediction without refinement. For example, the refinement result is clipped to 16 bits range. As noted above, the example techniques can also be applied to BDOF, where the displacement in two different directions are assumed to be in the same motion trajectory.

The following describes N bits (e.g., 16 bits) multiplication constrain. To reduce the complexity of gradient-based prediction refinement, multiplications may be kept within N bits (e.g., 16 bits). The gradient and displacements should be able to be represented by no more than 16 bits, in this example. If not, the gradient or displacement is quantized to be within 16 bits, in this example. For example, right shift may be applied to keep 16 bits representation.

The following describes clipping of the refinement offset $\Delta I(i,j)$ and refinement result. The refinement offset $\Delta I(i,j)$ is clipped to a certain range. In one example, the range is determined by the range of the original prediction signal. The range of $\Delta I(i,j)$ can be the same of the range of original prediction signal, or the range can be the scaled range. The scale can be $\frac{1}{2}$, $\frac{1}{4}$, $\frac{1}{8}$, etc. The refinement result is clipped to have the same range as the original prediction signal (e.g., the range of samples in the prediction block). The equation to perform the clipping is:

$$pb\text{Samples}[x][y]=\text{Clip3}(0,(2^{BitDepth})-1,(\text{predSamples}L0[x+1][y+1]+\text{offset4}+\text{predSamples}L1[x+1][y+1]+bd\text{ofOffset})>>\text{shift4})$$

In this way, video encoder 200 and video decoder 300 may be configured to determine a prediction block for inter-predicting a current block. For example, video encoder 200 and video decoder 300 may determine a motion vector or a block vector (e.g., for intra-block copy mode) that points to the prediction block.

Video encoder 200 and video decoder 300 may determine at least one of horizontal or vertical displacements for gradient-based prediction refinement of one or more samples of the prediction block. Examples of the horizontal displacement is $\Delta v_x$, and examples of the vertical displacement is $\Delta v_y$. In some examples, video encoder 200 and video decoder 300 may determine at least one of horizontal or vertical displacements for gradient-based prediction refinement of one or more samples of the prediction block based on the inter-prediction mode (e.g., determine $\Delta v_x$ and $\Delta v_y$ using the above example techniques for affine mode or determine $\Delta v_x$ and $\Delta v_y$ using the above example techniques for merge mode, as two examples).

In accordance with one or more examples, video encoder 200 and video decoder 300 may round at least one of the horizontal and the vertical displacements to a precision level that is same for different inter-prediction modes. Examples of the different inter-prediction modes include an affine mode and BDOF. For example, the precision level for a first horizontal or vertical displacement for performing gradient-based prediction refinement for a first block inter-predicted in a first inter-prediction mode may be at a first precision level, and the precision level for a second horizontal or vertical displacement for performing gradient-based prediction refinement for a second block inter-predicted in a second inter-prediction mode may be at a second precision level. Video encoder 200 and video decoder 300 may be configured to round the first precision level for the first horizontal or vertical displacement to the precision level, and round the second precision level for the first horizontal or vertical displacement to the same precision level.

In some examples, the precision level may be predefined (e.g., prestored on video encoder 200 and video decoder 300) or may be signaled (e.g., defined by video encoder 200 and signaled to video decoder 300). In some examples, the precision level may be 1/64.

Video encoder 200 and video decoder 300 may be configured for determining one or more refinement offsets based on the rounded at least one of the horizontal or vertical displacements. For example, video encoder 200 and video decoder 300 may determine $\Delta I(i,j)$ for each sample of the prediction block using respective rounded at least one of the horizontal or vertical displacements. That is, video encoder 200 and video decoder 300 may determine a refinement offset for each sample of the prediction block. In some examples, video encoder 200 and video decoder 300 may utilize the rounded horizontal and vertical displacements to determine the refinement offset (e.g., $\Delta I$).

As described, to perform the gradient-based prediction refinement, video encoder 200 and video decoder 300 may determine a first gradient-based on a first set of samples of the one or more samples of the prediction block (e.g., determine $g_x(i,j)$, where the first set of samples are samples used to determine $g_x(i,j)$) and determine a second gradient-based on a second set of samples of the one or more samples of the prediction block (e.g., determine $g_y(i,j)$, where the second set of samples are samples used to determine $g_y(i,j)$). Video encoder 200 and video decoder 300 may determine the refinement offsets based on the rounded horizontal and vertical displacements and the first and second gradients.

Video encoder 200 and video decoder 300 may modify the one or more samples of the prediction block based on the determined one or more refinement offsets to generate a modified prediction block (e.g., one or more modified samples that form the modified prediction block). For example, video encoder 200 and video decoder 300 may add or subtract $\Delta I(i,j)$ from $I(i,j)$, where $I(i,j)$ refers to the sample in the prediction block located at position (i,j). In some examples, video encoder 200 and video decoder 300 may clip the one or more refinement offsets (e.g., clip $\Delta I(i,j)$). Video encoder 200 and video decoder 300 may modify the one or more samples of the prediction block based on the clipped one or more refinement offsets.

For encoding, video encoder 200 may determine residual values (e.g., of a residual block), indicative of a difference, between the current block and the modified prediction block (e.g., based on modified samples of the modified prediction block), and signal information indicative of the residual values. For decoding, video decoder 300 may receive the information indicative of the residual values and reconstruct the current block based on the modified prediction block (e.g., modified samples of the modified prediction block) and the residual values (e.g., by adding the residual values to the modified samples).

Figure 2A:
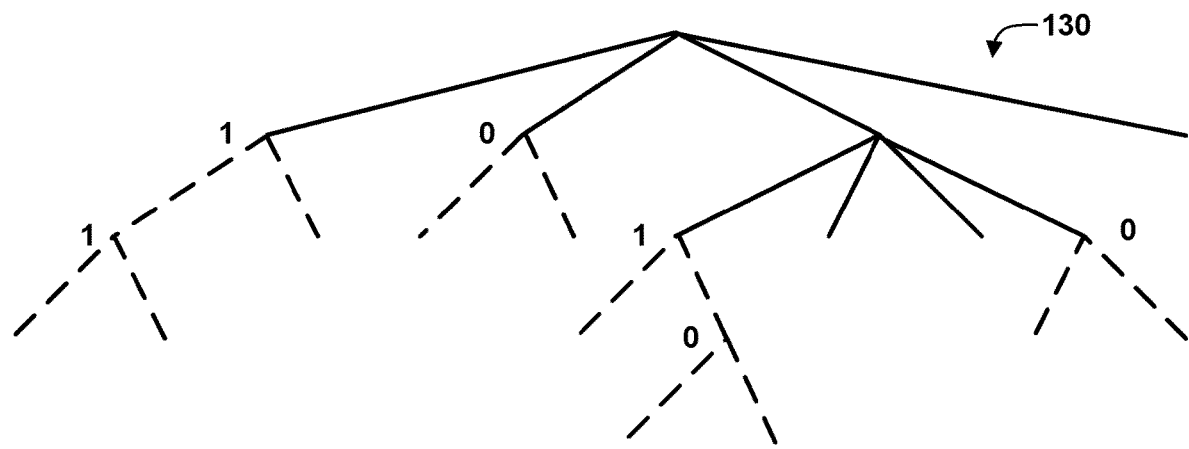
FIGS. 2A and 2B are conceptual diagrams illustrating an example quadtree binary tree (QTBT) structure, and a corresponding coding tree unit (CTU).
Figure 2B:
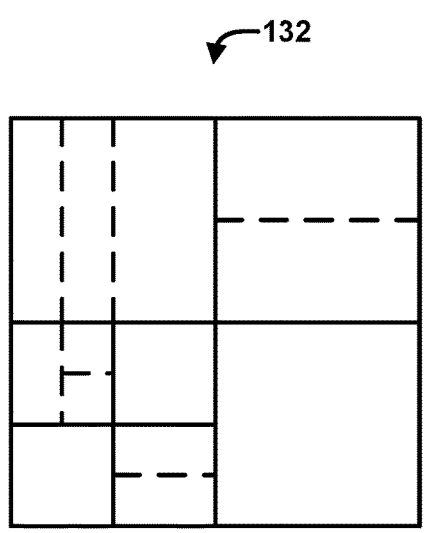

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 subblocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
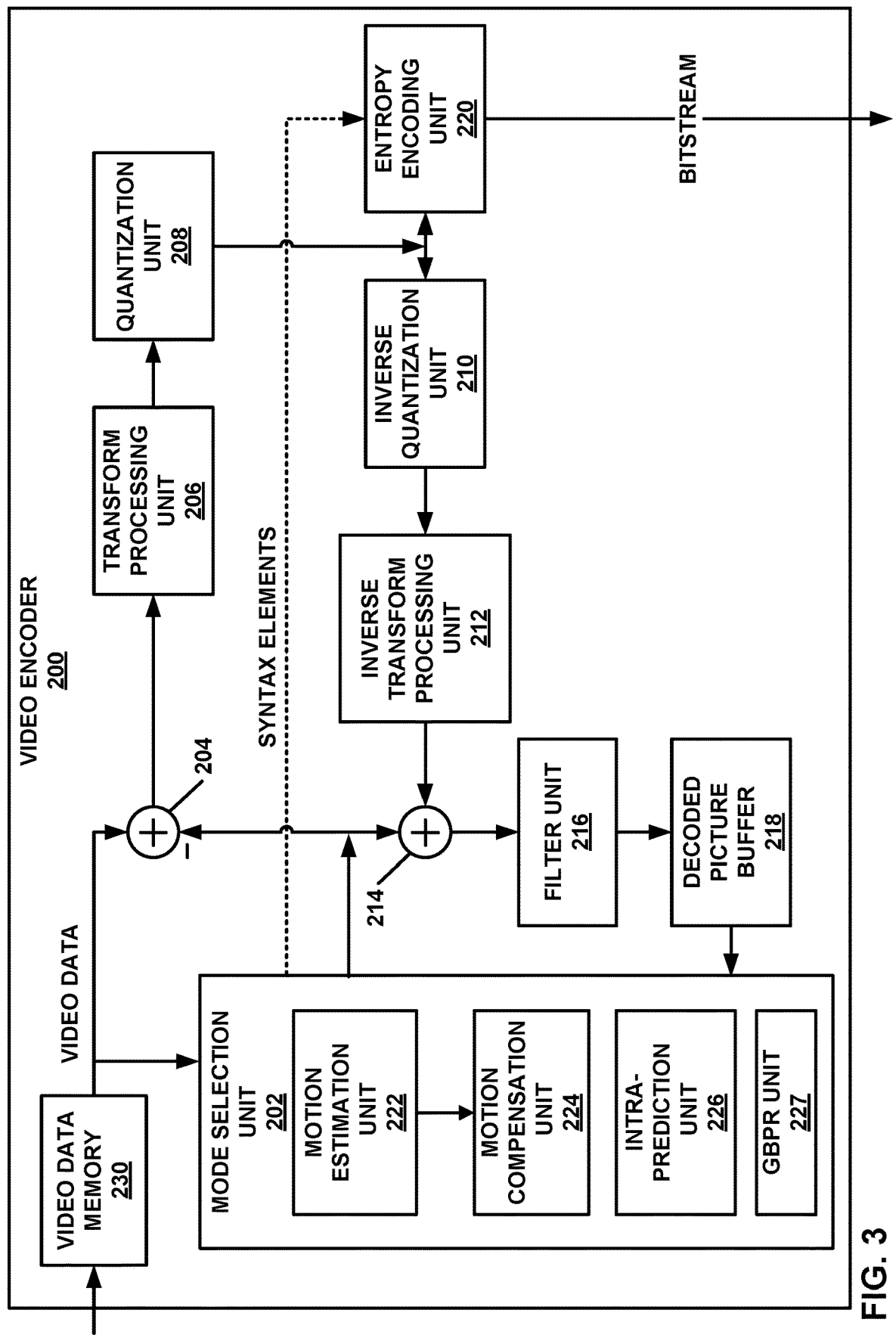
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, an intra-prediction unit 226, a gradient-based prediction refinement (GBPR) unit 227. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Although GBPR unit 227 is illustrated as being separate from motion estimation unit 222 and motion compensation unit 224, in some examples, GBPR unit 227 may be part of motion estimation unit 222 and/or motion compensation unit 224. GBPR unit 227 is shown separate from motion estimation unit 222 and motion compensation unit 224 to ease with understanding and should not be considered limiting.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual values of the CUs, quantization parameters for residual values of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, intra-prediction unit 226, and GBPR unit 227) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

GBPR unit 227 may be configured to perform the example techniques described in this disclosure for gradient-based prediction refinement. For example, GBPR unit 227, along with motion compensation unit 224, may determine a prediction block for inter-predicting a current block (e.g., based on a motion vector determined by motion estimation unit 222). GBPR unit 227 may determine horizontal and vertical displacements (e.g., $\Delta v_x$ and $\Delta v_y$) for gradient-based prediction refinement of one or more samples of the prediction block. As one example, GBPR unit 227 may determine an inter-prediction mode, based on determinations made by mode selection unit 202, for inter-predicting the current block. In some examples, GBPR unit 227 may determine the horizontal and vertical displacements based on the determined inter-prediction mode.

GBPR unit 227 may round the horizontal and vertical displacements to a precision level that is same for different inter-prediction modes. For example, the current block may be a first current block, the prediction block may be a first prediction block, the horizontal and vertical displacements may be first horizontal and vertical displacements, and the rounded horizontal and vertical displacements may be first rounded horizontal and vertical displacements. In some examples, GBPR unit 227 may determine a second prediction block for inter-predicting a second current block and determine second horizontal and vertical displacements for gradient-based prediction refinement of one or more samples of the second prediction block. GBPR unit 227 may round the second horizontal and vertical displacements to the same precision level to which the first horizontal and vertical displacements were rounded to generate second rounded horizontal and vertical displacements.

In some cases, the inter-prediction mode for inter-predicting the first current block and the inter-prediction mode for the second current block may be different. For instance, a first mode of the different inter-prediction modes is an affine mode, and a second mode of the different inter-prediction modes is a bi-directional optical flow (BDOF) mode.

The precision level to which the horizontal and vertical displacements are rounded may be predefined and stored for use by GBPR unit 227, or GBPR unit 227 may determine the precision level and video encoder 200 may signal the precision level. As one example, the precision level is 1/64.

GBPR unit 227 may determine one or more refinement offsets based on the rounded horizontal and vertical displacements. For example, GBPR unit 227 may determine a first gradient-based on a first set of samples of the one or more samples of the prediction block (e.g., determine $g_x(i,j)$ using the samples of the prediction block described above) and determine a second gradient-based on a second set of samples of the one or more samples of the prediction block (e.g., determine $g_y(i,j)$ using the samples of the prediction block described above). GBPR unit 227 may determine the one or more refinement offsets based on the rounded horizontal and vertical displacements and the first and second gradients. In some examples, GBPR unit 227 may clip the one or more refinement offsets if the value of the one or more refinement offsets is too high (e.g., greater than a threshold).

GBPR unit 227 may modify the one or more samples of the prediction block based on the determined one or more refinement offsets or clipped one or more refinement offsets to generate a modified prediction block (e.g., one or more modified samples that form the modified prediction block). For instance, GBPR unit 227 may determine: $g_x(i,j)*\Delta v_x(i,j)+g_y(i,j)*\Delta v_y(i,j)$, wherein $g_x(i,j)$ is the first gradient for a sample of the one or more samples located at $(i,j)$, $\Delta v_x(i,j)$ is the rounded horizontal displacement for the sample of the one or more samples located at $(i,j)$, $g_y(i,j)$ is the second gradient for the sample of the one or more samples located at $(i,j)$, and $\Delta v_y(i,j)$ is the rounded vertical displacement for the sample of the one or more samples located at $(i,j)$. In some examples, $\Delta v_x$ and $\Delta v_y$ may be the same for each of the samples $(i,j)$ of the prediction block.

The resulting modified samples may form the prediction block (e.g., modified prediction block) in gradient-based prediction refinement. That is, the modified prediction block is used as the prediction block in gradient-based prediction refinement. Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter-prediction. Video encoder 200 and video decoder 300 may also support asymmetric partitioning for PU sizes of 2N×nU, 2N×nD, nL×2N, and nR×2N for inter-prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 4:
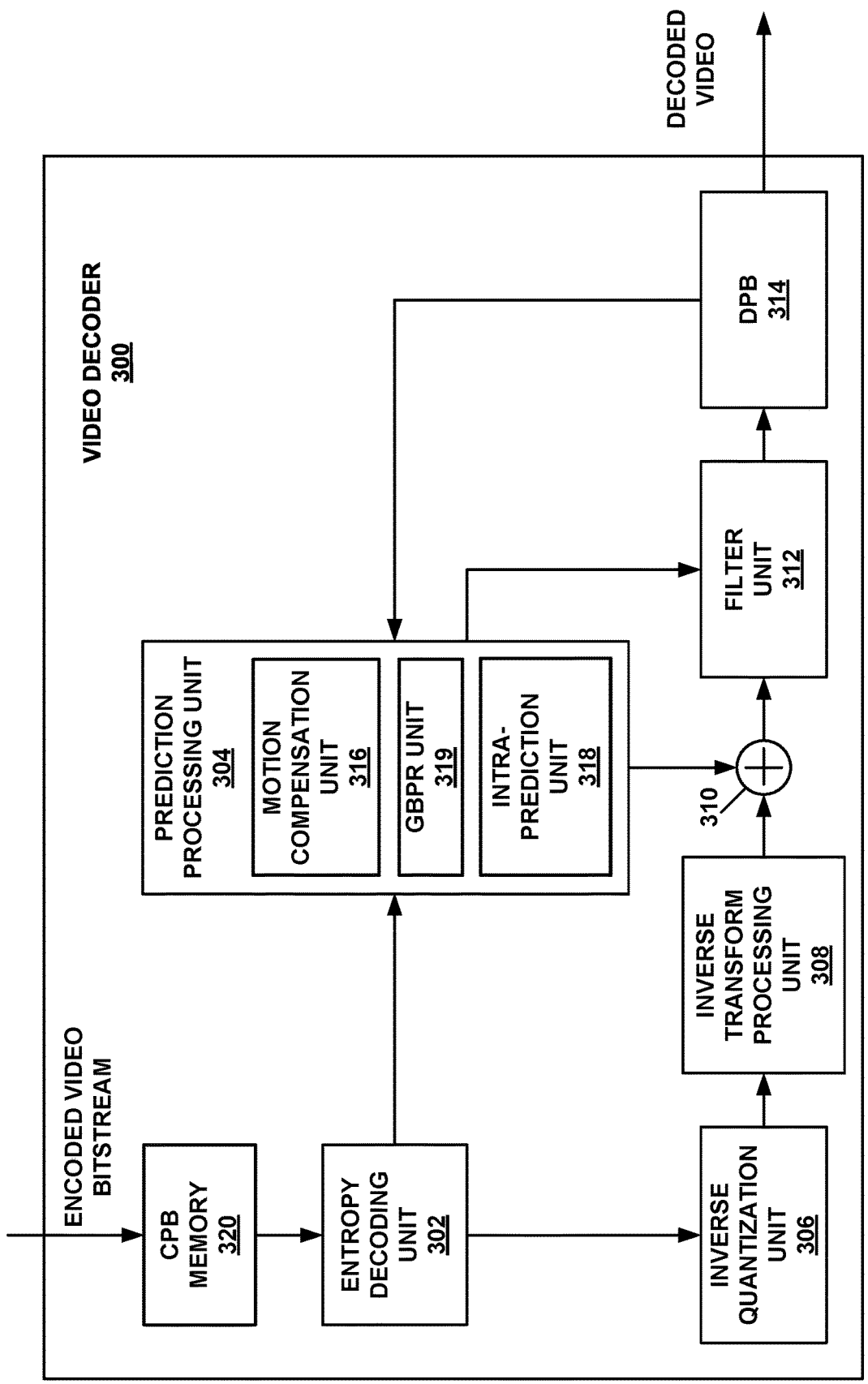
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316, intra-prediction unit 318, and gradient-based prediction refinement (GBPR) unit 319. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

Although GBPR unit 319 is illustrated as being separate from motion compensation unit 316, in some examples, GBPR unit 319 may be part of motion compensation unit 316. GBPR unit 319 is shown separate from motion compensation unit 316 to ease with understanding and should not be considered limiting.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream.

CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

As another example, if the prediction information syntax elements indicate that gradient-based prediction refinement is enabled, GBPR unit 319 may modify samples of a prediction block to generate the modified prediction block (e.g., generate modified samples that form the modified prediction block) that are used for reconstructing the current block.

GBPR unit 319 may be configured to perform the example techniques described in this disclosure for gradient-based prediction refinement. For example, GBPR unit 319, along with motion compensation unit 316, may determine a prediction block for inter-predicting a current block (e.g., based on a motion vector determined by prediction processing unit 304). GBPR unit 319 may determine horizontal and vertical displacements (e.g., $\Delta v_x$ and $\Delta v_y$) for gradient-based prediction refinement of one or more samples of the prediction block. As one example, GBPR unit 319 may determine an inter-prediction mode, based on prediction information syntax elements, for inter-predicting the current block. In some examples, GBPR unit 319 may determine the horizontal and vertical displacements based on the determined inter-prediction mode.

GBPR unit 319 may round the horizontal and vertical displacements to a precision level that is same for different inter-prediction modes. For example, the current block may be a first current block, the prediction block may be a first prediction block, the horizontal and vertical displacements may be first horizontal and vertical displacements, and the rounded horizontal and vertical displacements may be first rounded horizontal and vertical displacements. In some examples, GBPR unit 319 may determine a second prediction block for inter-predicting a second current block and determine second horizontal and vertical displacements for gradient-based prediction refinement of one or more samples of the second prediction block. GBPR unit 319 may round the second horizontal and vertical displacements to the same precision level to which the first horizontal and vertical displacements were rounded to generate second rounded horizontal and vertical displacements.

In some cases, the inter-prediction mode for inter-predicting the first current block and the inter-prediction mode for the second current block may be different. For instance, a first mode of the different inter-prediction modes is an affine mode, and a second mode of the different inter-prediction modes is a bi-directional optical flow (BDOF) mode.

The precision level to which the horizontal and vertical displacements are rounded may be predefined and stored for use by GBPR unit 319, or GBPR unit 319 may receive information indicative of the precision level in signaled information (e.g., the precision level is signaled). As one example, the precision level is 1/64.

GBPR unit 319 may determine one or more refinement offsets based on the rounded horizontal and vertical displacements. For example, GBPR unit 319 may determine a first gradient-based on a first set of samples of the one or more samples of the prediction block (e.g., determine $g_x(i,j)$ using the samples of the prediction block described above) and determine a second gradient-based on a second set of samples of the one or more samples of the prediction block (e.g., determine $g_y(i,j)$ using the samples of the prediction block described above). GBPR unit 319 may determine the one or more refinement offsets based on the rounded horizontal and vertical displacements and the first and second gradients. In some examples, GBPR unit 319 may clip the one or more refinement offsets if the value of the one or more refinement offsets is too high (e.g., greater than a threshold).

GBPR unit 319 may modify the one or more samples of the prediction block based on the determined one or more refinement offsets or clipped one or more refinement offsets to generate a modified prediction block (e.g., one or more modified samples that form the modified prediction block). For instance, GBPR unit 319 may determine: $g_x(i,j)*\Delta v_x(i,j)+g_y(i,j)*\Delta v_y(i,j)$, wherein $g_x(i,j)$ is the first gradient for a sample of the one or more samples located at $(i,j)$, $\Delta v_x(i,j)$ is the rounded horizontal displacement for the sample of the one or more samples located at $(i,j)$, $g_y(i,j)$ is the second gradient for the sample of the one or more samples located at $(i,j)$, and $\Delta v_y(i,j)$ is the rounded vertical displacement for the sample of the one or more samples located at $(i,j)$. In some examples, $\Delta v_x$ and $\Delta v_y$ may be the same for each of the samples $(i,j)$ of the prediction block.

The resulting modified samples may form the modified prediction block in gradient-based prediction refinement. That is, the modified prediction block may be used as the prediction block in gradient-based prediction refinement. Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Figure 5:
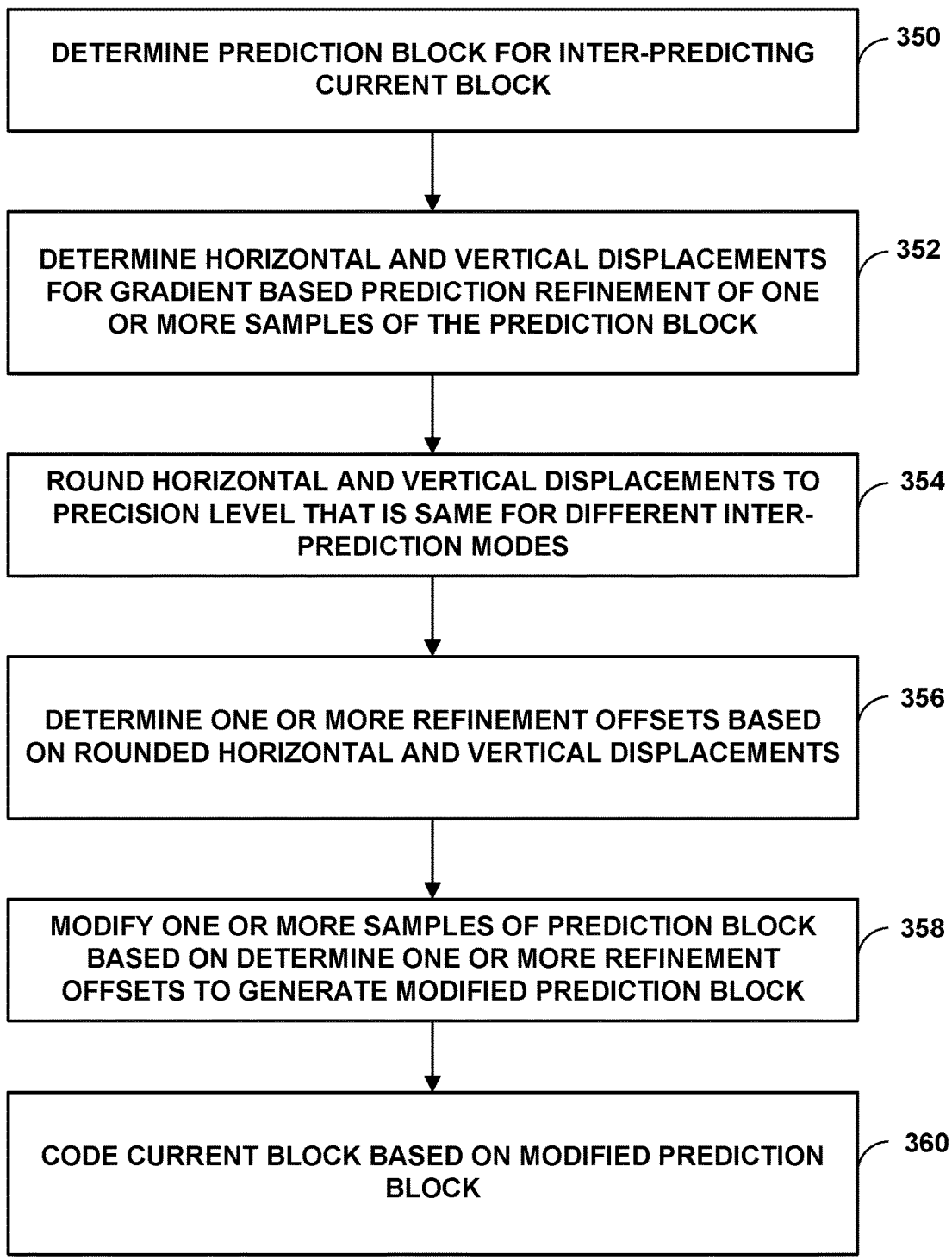
FIG. 5 is a flowchart illustrating an example method of coding video data.

FIG. 5 is a flowchart illustrating an example method for coding video data. The current block may include a current CU. The example of FIG. 5 is described with respect to processing circuitry. Examples of the processing circuitry include fixed-function and/or programmable circuitry for video encoder 200, such as GBPR unit 227, and video decoder 300, such as GBPR unit 319.

In one or more examples, memory may be configured to store samples of a prediction block. For example, DPB 218 or DPB 314 may be configured to store samples of the prediction block that is used for inter-predicting. Intra-block copy may be considered as an example inter-prediction mode, in which case a block vector used for intra-block copy is an example of a motion vector.

The processing circuitry may determine a prediction block stored in the memory for inter-predicting a current block (350). The processing circuitry may determine horizontal and vertical displacements (e.g., $\Delta v_x$ and $\Delta v_y$) for gradient-based prediction refinement of one or more samples of the prediction block (352). As one example, the processing circuitry may determine an inter-prediction mode for inter-predicting the current block. In some examples, the processing circuitry may determine the horizontal and vertical displacements based on the determined inter-prediction mode.

The processing circuitry may round the horizontal and vertical displacements to a precision level that is same for different inter-prediction modes (354). For example, the current block may be a first current block, the prediction block may be a first prediction block, the horizontal and vertical displacements may be first horizontal and vertical displacements, and the rounded horizontal and vertical displacements may be first rounded horizontal and vertical displacements. In some examples, the processing circuitry may determine a second prediction block for inter-predicting a second current block and determine second horizontal and vertical displacements for gradient-based prediction refinement of one or more samples of the second prediction block. The processing circuitry may round the second horizontal and vertical displacements to the same precision level to which the first horizontal and vertical displacements were rounded to generate second rounded horizontal and vertical displacements.

In some cases, the inter-prediction mode for inter-predicting the first current block and the inter-prediction mode for the second current block may be different. For instance, a first mode of the different inter-prediction modes is an affine mode, and a second mode of the different inter-prediction modes is a bi-directional optical flow (BDOF) mode.

The precision level to which the horizontal and vertical displacements are rounded may be predefined or signaled. As one example, the precision level is 1/64.

The processing circuitry may determine one or more refinement offsets based on the rounded horizontal and vertical displacements (356). For example, the processing circuitry may determine a first gradient-based on a first set of samples of the one or more samples of the prediction block (e.g., determine $g_x(i,j)$ using the samples of the prediction block described above) and determine a second gradient-based on a second set of samples of the one or more samples of the prediction block (e.g., determine $g_y(i,j)$ using the samples of the prediction block described above). The processing circuitry may determine the one or more refinement offsets based on the rounded horizontal and vertical displacements and the first and second gradients. In some examples, the processing circuitry may clip the one or more refinement offsets if the value of the one or more refinement offsets is too high (e.g., greater than a threshold).

The processing circuitry may modify the one or more samples of the prediction block based on the determined one or more refinement offsets or clipped one or more refinement offsets to generate a modified prediction block (e.g., one or more modified samples that form the modified prediction block) (358). For instance, the processing circuitry may determine: $g_x(i,j)*\Delta v_x(i,j)+g_y(i,j)*\Delta v_y(i,j)$, wherein $g_x(i,j)$ is the first gradient for a sample of the one or more samples located at (i,j), $\Delta v_x(i,j)$ is the rounded horizontal displacement for the sample of the one or more samples located at (i,j), $g_y(i,j)$ is the second gradient for the sample of the one or more samples located at (i,j), and $\Delta v_y(i,j)$ is the rounded vertical displacement for the sample of the one or more samples located at (i,j). In some examples, $\Delta v_x$ and $\Delta v_y$ may be the same for each of the samples (i,j) of the prediction block.

The processing circuitry may code (e.g., encode or decode) the current block based on the modified prediction block (e.g., the one or more modified samples of the modified prediction block) (360). For instance, for video decoding, the processing circuitry (e.g., video decoder 300) may reconstruct the current block based on the modified prediction block (e.g., by adding the one or more modified samples to the received residual values). For video encoding, the processing circuitry (e.g., video encoder 200) may determine residual values (e.g., of a residual block) between the current block and the modified prediction block (e.g., one or more modified samples of the modified prediction block), and signal information indicative of the residual values.

A non-limiting illustrative list of examples of the disclosure are described below.

Example 1

A method of decoding video data, the method comprising determining one or more prediction blocks for inter-predicting a current block, determining an inter-prediction mode for inter-predicting the current block, determining at least one of horizontal or vertical displacements for gradient based prediction refinement of one or more samples of the one or more prediction blocks based on the determined inter-prediction mode, modifying the one or more samples of the one or more prediction blocks based on the determined at least one of the horizontal or vertical displacements to generate one or more modified samples, and reconstructing the current block based on the one or more modified samples.

Example 2

The method of example 1, wherein determining the inter-prediction mode comprises determining that inter-prediction is applied to the current block having a small size, the method further comprising rounding a motion vector for the current block to an integer motion vector, wherein determining at least one of the horizontal or vertical displacements comprises determining at least one of the horizontal or vertical displacements based on a remaining of the rounding.

Example 3

The method of example 1, wherein the current block comprises a first block and the prediction block comprises a first prediction block, the method further comprising determining an inter-prediction mode for a second block having a small size, and based on the inter-prediction mode for the second block being merge mode, modifying one or more samples of a second prediction block for the second block using gradient based prediction refinement, wherein gradient based prediction refinement is disabled for blocks having the small size that are not inter-predicted in merge mode.

Example 4

The method of example 1, wherein the current block comprises a first block and the prediction block comprises a first prediction block, the method further comprising determining an inter-prediction mode for a second block having a small size, and based on the inter-prediction mode for the second block not being integer motion mode, modifying one or more samples of a second prediction block for the second block using gradient based prediction refinement, wherein gradient based prediction refinement is disabled for blocks having the integer motion mode, wherein, in the integer motion mode, one or more signaled motion vectors are integers.

Example 5

The method of example 1, wherein determining the inter-prediction mode comprises determining that the current block is inter-predicted in merge mode, the method further comprising rounding a motion vector derived from a spatial or temporal neighboring block, wherein determining at least one of the horizontal or vertical displacements comprises determining at least one of the horizontal or vertical displacements based on a remaining of the rounding.

Example 6

The method of example 1, wherein determining the inter-prediction mode comprises determining that the current block is inter-predicted in merge with motion vector difference mode, the method further comprising rounding a motion vector difference, wherein determining at least one of the horizontal or vertical displacements comprises determining at least one of the horizontal or vertical displacements based on a remaining of the rounding.

Example 7

The method of example 1, wherein determining the inter-prediction mode comprises determining that the current block is inter-predicted in decoder side motion vector refinement mode, the method further comprising determining original bi-prediction blocks using original motion vectors, determining DistOrig based on difference between bi-prediction blocks, and determining DistNew based on search in a range of integer displacements of rounded original vectors, wherein determining at least one of the horizontal or vertical displacements comprises, based on DistNew being less than DistOrig, performing a bi-direction optical flow (BDOF) to determine at least one of the horizontal or vertical displacements.

Example 8

The method of example 1, wherein determining the inter-prediction mode comprises determining that the current block is inter-predicted in affine mode, and wherein determining at least one of the horizontal or vertical displacements comprises determining at least one of the horizontal or vertical displacements based on positions of the sub-blocks of the current block.

Example 9

The method of example 1, further comprising rounding at least one of the horizontal and the vertical displacements to a predefined precision that is same for different inter-prediction modes, wherein modifying the one or more samples comprises modifying the one or more samples of the one or more prediction blocks based on the rounded at least one of the horizontal or vertical displacements to generate the one or more modified samples.

Example 10

The method of example 1, further comprising clipping the one or more modified samples, wherein reconstructing the current block comprises reconstructing the current block based on the one or more clipped, modified samples.

Example 11

A method comprising a combination of one or more features of any of examples 1-10.

Example 12

A method of encoding video data, the method comprising determining one or more prediction blocks for inter-predicting a current block, determining an inter-prediction mode for inter-predicting the current block, determining at least one of horizontal or vertical displacements for gradient based prediction refinement of one or more samples of the one or more prediction blocks based on the determined inter-prediction mode, modifying the one or more samples of the one or more prediction blocks based on the determined at least one of the horizontal or vertical displacements to generate one or more modified samples, determining residual values based on the current block and the one or more modified samples, and signaling information indicative of the residual values.

Example 13

The method of example 12, wherein determining the inter-prediction mode comprises determining that inter-prediction is applied to the current block having a small size, the method further comprising rounding a motion vector for the current block to an integer motion vector, wherein determining at least one of the horizontal or vertical displacements comprises determining at least one of the horizontal or vertical displacements based on a remaining of the rounding.

Example 14

The method of example 12, wherein the current block comprises a first block and the prediction block comprises a first prediction block, the method further comprising determining an inter-prediction mode for a second block having a small size and based on the inter-prediction mode for the second block being merge mode, modifying one or more samples of a second prediction block for the second block using gradient based prediction refinement, wherein gradient based prediction refinement is disabled for blocks having the small size that are not inter-predicted in merge mode.

Example 15

The method of example 12, wherein the current block comprises a first block and the prediction block comprises a first prediction block, the method further comprising determining an inter-prediction mode for a second block having a small size and based on the inter-prediction mode for the second block not being integer motion mode, modifying one or more samples of a second prediction block for the second block using gradient based prediction refinement, wherein gradient based prediction refinement is disabled for blocks having the integer motion mode, wherein, in the integer motion mode, one or more signaled motion vectors are integers.

Example 16

The method of example 12, wherein determining the inter-prediction mode comprises determining that the current block is inter-predicted in merge mode, the method further comprising rounding a motion vector derived from a spatial or temporal neighboring block, wherein determining at least one of the horizontal or vertical displacements comprises determining at least one of the horizontal or vertical displacements based on a remaining of the rounding.

Example 17

The method of example 12, wherein determining the inter-prediction mode comprises determining that the current block is inter-predicted in merge with motion vector difference mode, the method further comprising rounding a motion vector difference, wherein determining at least one of the horizontal or vertical displacements comprises determining at least one of the horizontal or vertical displacements based on a remaining of the rounding.

Example 18

The method of example 12, wherein determining the inter-prediction mode comprises determining that the current block is inter-predicted in decoder side motion vector refinement mode, the method further comprising determining original bi-prediction blocks using original motion vectors, determining DistOrig based on difference between bi-prediction blocks, and determining DistNew based on search in a range of integer displacements of rounded original vectors, wherein determining at least one of the horizontal or vertical displacements comprises, based on DistNew being less than DistOrig, performing a bi-direction optical flow (BDOF) to determine at least one of the horizontal or vertical displacements.

Example 19

The method of example 12, wherein determining the inter-prediction mode comprises determining that the current block is inter-predicted in affine mode, and wherein determining at least one of the horizontal or vertical displacements comprises determining at least one of the horizontal or vertical displacements based on positions of the sub-blocks of the current block.

Example 20

The method of example 12, further comprising rounding at least one of the horizontal and the vertical displacements to a predefined precision that is same for different inter-prediction modes, wherein modifying the one or more samples comprises modifying the one or more samples of the one or more prediction blocks based on the rounded at least one of the horizontal or vertical displacements to generate the one or more modified samples.

Example 21

The method of example 12, further comprising clipping the one or more modified samples, wherein determining residual values comprises determining residual values based on the current block and the one or more clipped, modified samples.

Example 22

A method comprising combination of features of any of examples 12-21.

Example 23

A device for decoding video data, the device comprising a memory configured to store video data including a prediction block and a video decoder comprising at least one fixed-function or programmable circuitry, wherein the video decoder is configured to perform the method of any of examples 1-11.

Example 24

The device of example 23, further comprising a display configured to display decoded video data.

Example 25

The device of any of examples 23 and 24, wherein the device comprises one or more of a camera, a computer, a mobile device, a broadcast receiver device, or a set-top box.

Example 26

A device for encoding video data, the device comprising a memory configured to store video data including a prediction block and a video encoder comprising at least one fixed-function or programmable circuitry, wherein the video encoder is configured to perform the method of any of examples 12-22.

Example 27

The device of example 26, further comprising a camera configured to capture the video data to be encoded.

Example 28

The device of any of examples 26 and 27, wherein the device comprises one or more of a computer, a mobile device, a broadcast receiver device, or a set-top box.

Example 29

A device for decoding video data, the device comprising means for performing the method of any of examples 1-11.

Example 30

A device for encoding video data, the device comprising means for performing the method of any of examples 12-22.

Example 31

A computer-readable storage medium comprising instructions stored thereon that when executed cause one or more processors of a device for decoding video data to perform the method of any of examples 1-11.

Example 32

A computer-readable storage medium comprising instructions stored thereon that when executed cause one or more processors of a device for encoding video data to perform the method of any of examples 12-22.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of decoding video data, the method comprising:
   determining a motion vector for inter-predicting a current block;
   determining a prediction block for inter-predicting the current block based on the determined motion vector;
   determining one or more refinement offsets for modifying one or more samples of the prediction block in accordance with gradient-based prediction refinement, wherein determining the one or more refinement offsets comprises:
      determining a horizontal displacement and a vertical displacement for the gradient-based prediction refinement of the one or more samples of the prediction block, wherein the horizontal displacement and the vertical displacement are used for determining the one or more refinement offsets that are used for modifying the one or more samples of the prediction block in accordance with the gradient-based prediction refinement;
      rounding the horizontal displacement and the vertical displacement, that are used for determining the one or more refinement offsets, to a precision level that is the same for different inter-prediction modes;
      determining a first gradient based on a first set of samples of the one or more samples of the prediction block; and determining a second gradient based on a second set of samples of the one or more samples of the prediction block, wherein determining the one or more refinement offsets comprises determining the one or more refinement offsets, for modifying the one or more samples of the prediction block in accordance with gradient-based prediction refinement, based on the first gradient for a sample of the one or more samples located at (i,j), the rounded horizontal displacement for the sample of the one or more samples located at (i,j), the second gradient for the sample of the one or more samples located at (i,j), and the rounded vertical displacement for the sample of the one or more samples located at (i,j);

modifying, in accordance with the gradient-based prediction refinement, the one or more samples of the prediction block based on the determined one or more refinement offsets to generate a modified prediction block, wherein modifying the one or more samples comprises selecting a clipping process from at least one of:

clipping the one or more refinement offsets to generate clipped refinement offsets, and modifying the one or more samples based on the clipped refinement offsets to generate the modified prediction block, or modifying the one or more samples of the prediction block based on the determined one or more refinement offsets to generate a refinement result, and clipping the refinement result to generate the modified prediction block; and reconstructing the current block based on the modified prediction block.

2. The method of claim 1, wherein a first mode of the different inter-prediction modes is an affine mode, and a second mode of the different inter-prediction modes is a mode different than the affine mode.

3. The method of claim 1, further comprising:
determining an inter-prediction mode for inter-predicting the current block,
wherein determining the horizontal displacement and the vertical displacement comprises determining the horizontal displacement and the vertical displacement based on the determined inter-prediction mode.

4. The method of claim 1, wherein the precision level is 1/64.

5. The method of claim 1, wherein the prediction block is a first prediction block, the current block is a first current block, the horizontal displacement and the vertical displacement are a first horizontal displacement and a first vertical displacement, the one or more refinement offsets are first one or more refinement offsets, the rounded horizontal displacement and the rounded vertical displacement are a first rounded horizontal displacement and a first vertical displacement, and the modified prediction block is a first modified prediction block, the method further comprising:

determining a second prediction block for inter-predicting a second current block;

determining second horizontal and vertical displacements for gradient-based prediction refinement of one or more samples of the second prediction block;

rounding the second horizontal and vertical displacements to the same precision level to which the first horizontal displacement and the first vertical displacement were rounded to generate second rounded horizontal and vertical displacements;

determining second one or more refinement offsets based on the second rounded horizontal and vertical displacements;

modifying the one or more samples of the second prediction block based on the determined second one or more refinement offsets to generate a second modified prediction block; and reconstructing the second current block based on the second modified prediction block.

6. A method of encoding video data, the method comprising:

determining a motion vector for inter-predicting a current block;

determining a prediction block for inter-predicting the current block based on the determined motion vector;

determining one or more refinement offsets for modifying one or more samples of the prediction block, that is determined based on the determined motion vector, in accordance with gradient-based prediction refinement, wherein determining the one or more refinement offsets comprises:

determining a horizontal displacement and a vertical displacement for the gradient-based prediction refinement of the one or more samples of the prediction block, wherein the horizontal displacement and the vertical displacement are used for determining the one or more refinement offsets that are used for modifying the one or more samples of the prediction block in accordance with the gradient-based prediction refinement;

rounding the horizontal displacement and the vertical displacement, that are used for determining the one or more refinement offsets, to a precision level that is the same for different inter-prediction modes;

determining a first gradient based on a first set of samples of the one or more samples of the prediction block; and determining a second gradient based on a second set of samples of the one or more samples of the prediction block, wherein determining the one or more refinement offsets comprises determining the one or more refinement offsets, for modifying the one or more samples of the prediction block in accordance with gradient-based prediction refinement, based on the first gradient for a sample of the one or more samples located at (i,j), the rounded horizontal displacement for the sample of the one or more samples located at (i,j), the second gradient for the sample of the one or more samples located at (i,j), and the rounded vertical displacement for the sample of the one or more samples located at (i,j);

modifying, in accordance with the gradient-based prediction refinement, the one or more samples of the prediction block based on the determined one or more refinement offsets to generate a modified prediction block, wherein modifying the one or more samples comprises selecting a clipping process from at least one of:

clipping the one or more refinement offsets to generate clipped refinement offsets, and modifying the one or more samples based on the clipped refinement offsets to generate the modified prediction block, or modifying the one or more samples of the prediction block based on the determined one or more refinement offsets to generate a refinement result, and clipping the refinement result to generate the modified prediction block;

determining residual values indicative of a difference between the current block and the modified prediction block; and signaling information indicative of the residual values.

7. The method of claim 6, wherein a first mode of the different inter-prediction modes is an affine mode, and a second mode of the different inter-prediction modes is a mode different than the affine mode.

8. The method of claim 6, further comprising:
determining an inter-prediction mode for inter-predicting the current block,
wherein determining the horizontal displacement and the vertical displacement comprises determining the horizontal displacement and the vertical displacement based on the determined inter-prediction mode.

9. The method of claim 6, wherein the precision level is 1/64.

10. The method of claim 6, wherein the prediction block is a first prediction block, the current block is a first current block, the horizontal displacement and the vertical displacement are a first horizontal displacement and a first vertical displacement, the one or more refinement offsets are first one or more refinement offsets, the rounded horizontal displacement and the rounded vertical displacement are a first rounded horizontal displacement and a first rounded vertical displacement, the modified prediction block is a first modified prediction block, and the residual values comprise first residual values, the method further comprising:
determining a second prediction block for inter-predicting a second current block;
determining second horizontal and vertical displacements for gradient-based prediction refinement of one or more samples of the second prediction block;
rounding the second horizontal and vertical displacements to the same precision level to which the first horizontal displacement and the first vertical displacement were rounded to generate second rounded horizontal and vertical displacements;
determining second one or more refinement offsets based on the second rounded horizontal and vertical displacements;
modifying the one or more samples of the second prediction block based on the determined second one or more refinement offsets to generate a second modified prediction block;
determining second residual values indicative of a difference between the second current block and the second modified prediction block; and
signaling information indicative of the second residual values.

11. A device for coding video data, the device comprising:
a memory configured to store one or more samples of a prediction block; and
processing circuitry configured to:
determining a motion vector for inter-predicting a current block;
determine the prediction block for inter-predicting the current block based on the determined motion vector;
determine one or more refinement offsets for modifying the one or more samples of the prediction block in accordance with gradient-based prediction refinement, wherein to determine the one or more refinement offsets, the processing circuitry is configured to:
determine a horizontal displacement and a vertical displacement for the gradient-based prediction refinement of the one or more samples of the prediction block, wherein the horizontal displacement and the vertical displacement are used for determining the one or more refinement offsets that are used for modifying the one or more samples of the prediction block in accordance with the gradient-based prediction refinement;
round the horizontal displacement and the vertical displacement, that are used for determining the one or more refinement offsets, to a precision level that is the same for different inter-prediction modes;
determine a first gradient based on a first set of samples of the one or more samples of the prediction block; and
determine a second gradient based on a second set of samples of the one or more samples of the prediction block,
wherein to determine one or more refinement offsets, the processing circuitry is configured to determine the one or more refinement offsets, for modifying the one or more samples of the prediction block in accordance with gradient-based prediction refinement, based on the first gradient for a sample of the one or more samples located at (i,j), the rounded horizontal displacement for the sample of the one or more samples located at (i,j), the second gradient for the sample of the one or more samples located at (i,j), and the rounded vertical displacement for the sample of the one or more samples located at (i,j);
modify, in accordance with the gradient-based prediction refinement, the one or more samples of the prediction block based on the determined one or more refinement offsets to generate a modified prediction block, wherein to modify the one or more samples, the processing circuitry is configured to select a clipping process from at least one of:
clip the one or more refinement offsets to generate clipped refinement offsets, and modify the one or more samples based on the clipped refinement offsets to generate the modified prediction block, or
modify the one or more samples of the prediction block based on the determined one or more refinement offsets to generate a refinement result, and clip the refinement result to generate the modified prediction block; and
code the current block based on the modified prediction block.

12. The device of claim 11, wherein to code the current block, the processing circuitry is configured to reconstruct the current block based on the modified prediction block.

13. The device of claim 11, wherein to code the current block, the processing circuitry is configured to:
determine residual values indicative of a difference between the current block and the modified prediction block; and
signal information indicative of the residual values.

14. The device of claim 11, wherein a first mode of the different inter-prediction modes is an affine mode, and a second mode of the different inter-prediction modes is a mode different than the affine mode.

15. The device of claim 11, wherein the processing circuitry is configured to:
   determine an inter-prediction mode for inter-predicting the current block,
   wherein to determine the horizontal displacement and the vertical displacement, the processing circuitry is configured to determine the horizontal displacement and the vertical displacement based on the determined inter-prediction mode.

16. The device of claim 11, wherein the precision level is 1/64.

17. The device of claim 11, wherein the prediction block is a first prediction block, the current block is a first current block, the horizontal displacement and the vertical displacement are a first horizontal displacement and a first vertical displacement, the one or more refinement offsets are first one or more refinement offsets, the rounded horizontal displacement and the rounded vertical displacement are a first rounded horizontal displacement and a first vertical displacement, and the modified prediction block is a first modified prediction block, and wherein the processing circuitry is configured to:
   determine a second prediction block for inter-predicting a second current block;
   determine second horizontal and vertical displacements for gradient-based prediction refinement of one or more samples of the second prediction block;
   round the second horizontal and vertical displacements to the same precision level to which the first horizontal displacement and the first vertical displacement were rounded to generate second rounded horizontal and vertical displacements;
   determine second one or more refinement offsets based on the second rounded horizontal and vertical displacements;
   modify the one or more samples of the second prediction block based on the determined second one or more refinement offsets to generate a second modified prediction block; and
   code the second current block based on the second modified prediction block.

18. The device of claim 11, further comprising a display configured to display decoded video data.

19. The device of claim 11, further comprising a camera configured to capture the video data to be encoded.

20. The device of claim 11, wherein the device comprises one or more of a camera, a computer, a wireless communication device, a broadcast receiver device, or a set-top box.

21. A non-transitory computer-readable storage medium storing instructions thereon that when executed cause one or more processors to:
   determine a motion vector for inter-predicting a current block;
   determine a prediction block for inter-predicting the current block based on the determined motion vector;
   determine one or more refinement offsets for modifying one or more samples of the prediction block in accordance with gradient-based prediction refinement, wherein the instructions that cause the one or more processors to determine the one or more refinement offsets comprise instructions that cause the one or more processors to:
      determine a horizontal displacement and a vertical displacement for the gradient-based prediction refinement of the one or more samples of the prediction block, wherein the horizontal displacement and the vertical displacement are used for determining the one or more refinement offsets that are used for modifying the one or more samples of the prediction block in accordance with the gradient-based prediction refinement;
      round the horizontal displacement and the vertical displacement, that are used for determining the one or more refinement offsets, to a precision level that is the same for different inter-prediction modes;
      determine a first gradient based on a first set of samples of the one or more samples of the prediction block; and
      determine a second gradient based on a second set of samples of the one or more samples of the prediction block,
      wherein the instructions that cause the one or more processors to determine the one or more refinement offsets comprise instructions that cause the one or more processors to determine the one or more refinement offsets, for modifying the one or more samples of the prediction block in accordance with gradient-based prediction refinement, based on the first gradient for a sample of the one or more samples located at (i,j), the rounded horizontal displacement for the sample of the one or more samples located at (i,j), the second gradient for the sample of the one or more samples located at (i,j), and the rounded vertical displacement for the sample of the one or more samples located at (i,j);
   modify, in accordance with the gradient-based prediction refinement, the one or more samples of the prediction block based on the determined one or more refinement offsets to generate a modified prediction block, wherein the instructions to modify the one or more samples comprise instructions to select a clipping process from at least one of instructions to:
      clip the one or more refinement offsets to generate clipped refinement offsets, and modify the one or more samples based on the clipped refinement offsets to generate the modified prediction block, or
      modify the one or more samples of the prediction block based on the determined one or more refinement offsets to generate a refinement result, and clip the refinement result to generate the modified prediction block; and
   code the current block based on the modified prediction block.

22. A device for coding video data, the device comprising:
   means for determining a motion vector for inter-predicting a current block;
   means for determining a prediction block for inter-predicting the current block based on the determined motion vector;
   means for determining one or more refinement offsets for modifying one or more samples of the prediction block in accordance with gradient-based prediction refinement, wherein the means for determining the one or more refinement offsets comprises:
      means for determining a horizontal displacement and a vertical displacement for the gradient-based prediction refinement of the one or more samples of the prediction block, wherein the horizontal displacement and the vertical displacement are used for determining the one or more refinement offsets that are used for modifying the one or more samples of the prediction block in accordance with the gradient-based prediction refinement;

means for rounding the horizontal displacement and the vertical displacement, that are used for determining the one or more refinement offsets, to a precision level that is the same for different inter-prediction modes;

means for determining a first gradient based on a first set of samples of the one or more samples of the prediction block; and means for determining a second gradient based on a second set of samples of the one or more samples of the prediction block, wherein the means for determining the one or more refinement offsets comprises means for determining the one or more refinement offsets, for modifying the one or more samples of the prediction block in accordance with gradient-based prediction refinement, based on the first gradient for a sample of the one or more samples located at (i,j), the rounded horizontal displacement for the sample of the one or more samples located at (i,j), the second gradient for the sample of the one or more samples located at (i,j), and the rounded vertical displacement for the sample of the one or more samples located at (i,j);

means for modifying, in accordance with the gradient-based prediction refinement, the one or more samples of the prediction block based on the determined one or more refinement offsets to generate a modified prediction block, wherein the means modifying the one or more samples comprises means for selecting a clipping process from at least one of:

means for clipping the one or more refinement offsets to generate clipped refinement offsets, and modifying the one or more samples based on the clipped refinement offsets to generate the modified prediction block, or means for modifying the one or more samples of the prediction block based on the determined one or more refinement offsets to generate a refinement result, and clipping the refinement result to generate the modified prediction block; and means for coding the current block based on the modified prediction block.

23. The method of claim 1, wherein a first mode of the different inter-prediction modes is a bi-directional optical flow (BDOF), and a second mode of the different inter-prediction modes is a mode different than the BDOF.

24. The method of claim 6, wherein a first mode of the different inter-prediction modes is a bi-directional optical flow (BDOF), and a second mode of the different inter-prediction modes is a mode different than the BDOF.

25. The device of claim 11, wherein a first mode of the different inter-prediction modes is a bi-directional optical flow (BDOF), and a second mode of the different inter-prediction modes is a mode different than the BDOF.

* * * * *